US011532128B2

(12) United States Patent
Wang

(10) Patent No.: US 11,532,128 B2
(45) Date of Patent: Dec. 20, 2022

(54) ADVANCED SIGNALING OF REGIONS OF INTEREST IN OMNIDIRECTIONAL VISUAL MEDIA

(71) Applicant: QUALCOMM Incorporated, San Diego, CA (US)

(72) Inventor: Yekui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/927,799

(22) Filed: Mar. 21, 2018

(65) Prior Publication Data

US 2018/0276890 A1    Sep. 27, 2018

Related U.S. Application Data

(60) Provisional application No. 62/475,714, filed on Mar. 23, 2017.

(51) Int. Cl.
*G06T 19/00*    (2011.01)
*G06T 15/20*    (2011.01)
(Continued)

(52) U.S. Cl.
CPC .......... *G06T 19/003* (2013.01); *G06T 15/005* (2013.01); *G06T 15/20* (2013.01); *H04N 21/4728* (2013.01); *H04N 21/6125* (2013.01)

(58) Field of Classification Search
CPC ..... G06T 19/003; G06T 15/005; G06T 15/20; H04N 21/4728; H04N 21/6125;
(Continued)

(56) References Cited

U.S. PATENT DOCUMENTS 10,687,043 B2    6/2020    Lee et al.
10,742,999 B2    8/2020    Wang et al.
(Continued)

FOREIGN PATENT DOCUMENTS

CN    105898254 A    8/2016
CN    105917649 A    8/2016
(Continued)

OTHER PUBLICATIONS

Forutanpour B., et al., "Signalling of Fisheye VR Video Information in ISO BMFF", 115. MPEG Meeting; May 30, 2016-Jun. 3, 2016; Geneva; (Motion Picture Expert Group OR ISO/I EC JTC1/SC29/WG11),, No. m38561, May 25, 2016 (May 25, 2016), pp. 7, XP030066917.
(Continued)

*Primary Examiner* — Maria E Vazquez Colon
(74) *Attorney, Agent, or Firm* — Shumaker & Sieffert, P.A.

(57) ABSTRACT

In various implementations, modifications and/or additions to the ISOBMFF can indicate that a file that has been formatted according to the ISOBMFF, or a format derived from the ISOBMFF, includes virtual reality content. The file can include a restricted scheme information box, written into a track box in the file. The restricted scheme information box can indicate a virtual reality scheme for the contents of the track. For example, a signaling mechanism may indicate a most-viewed viewport associated with the virtual reality data.

27 Claims, 14 Drawing Sheets

(51) Int. Cl.
*G06T 15/00* (2011.01)
*H04N 21/61* (2011.01)
*H04N 21/4728* (2011.01)

(58) Field of Classification Search
CPC ............... H04N 19/70; H04N 19/167; H04N 21/234345; H04N 21/816; H04N 21/235; H04N 21/440245; G09F 3/011
See application file for complete search history.

(56) References Cited

U.S. PATENT DOCUMENTS

| | | | |
|---|---|---|---|
| 2013/0249900 A1 | 9/2013 | Lee et al. | |
| 2015/0055937 A1 | 2/2015 | Van et al. | |
| 2015/0110203 A1 | 4/2015 | Wang et al. | |
| 2016/0373771 A1 | 12/2016 | Hendry et al. | |
| 2017/0171610 A1* | 6/2017 | Nair | H04N 21/2362 |
| 2017/0347026 A1* | 11/2017 | Hannuksela | G09G 5/14 |
| 2018/0061002 A1* | 3/2018 | Lee | H04N 13/178 |
| 2018/0176468 A1* | 6/2018 | Wang | H04N 5/23238 |
| 2019/0141359 A1* | 5/2019 | Taquet | H04N 21/235 |
| 2019/0325652 A1 | 10/2019 | Di et al. | |
| 2020/0045286 A1* | 2/2020 | Boyce | H04N 21/84 |
| 2021/0201855 A1* | 7/2021 | Kammachi-Sreedhar | H04N 21/4728 |

FOREIGN PATENT DOCUMENTS

| | | | | |
|---|---|---|---|---|
| GB | 2550587 A | 11/2017 | | |
| WO | 2015200666 A1 | 12/2015 | | |
| WO | WO-2018120474 A1 * | 7/2018 | ............ | G06T 19/00 |
| WO | WO-2018128071 A1 * | 7/2018 | | |

OTHER PUBLICATIONS

"Information technology—Coding of audio-visual objects—Part 12: ISO base media file format", ISO/IEC 14496-12:2015, IEC, 3, Rue De Varembe, PO Box 131, CH-1211 Geneva 20, SWITZERLAND, Nov. 25, 2015 (Nov. 25, 2015), pp. 1-233, XP082009954.
International Search Report and Written Opinion—PCT/US2018/024057—ISA/EPO—dated Jun. 5, 2018.
Oh S., et al., "Signaling of Static Metadata for VR Video in ISOBMFF", 116. MPEG Meeting; Oct. 17, 2016-Oct. 21, 2016; Chengdu; (Motion Picture Expert Group OR ISO/IEC JTC1/SC29/WG11), No. m38948, Sep. 14, 2016 (Sep. 14, 2016), pp. 7, XP030067296.
Stockhammer T., et al., "Referenceable Features in OMAF", 118. MPEG Meeting; Apr. 3, 2017-Apr. 7, 2017; Hobart; (Motion Picture Expert Group OR ISO/IEC JTC1/SC29/WG11),, No. m40238, Mar. 9, 2017 (Mar. 9, 2017), pp. 5, XP030068583.

\* cited by examiner

ADVANCED SIGNALING OF REGIONS OF INTEREST IN OMNIDIRECTIONAL VISUAL MEDIA

CLAIM OF PRIORITY UNDER 35 U.S.C. § 119

The present application for patent claims priority to Provisional Application No. 62/475,714 entitled "Advanced signalling of regions of interest in omnidirectional visual media" filed Mar. 23, 2017, and assigned to the assignee hereof and hereby expressly incorporated by reference herein.

BACKGROUND

Field

This application is related to the storage and processing of virtual reality (VR) video contents in one or more media file formats, such as an ISO based media file format (ISOBMFF) and/or file formats derived from the ISOBMFF.

Background

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its scalable video coding extension known as Scalable Video Coding (SVC) and its multiview video coding extension Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC).

SUMMARY

In some embodiments, techniques are described for indicating in a file that the file includes virtual reality content, so that video player devices can properly render and/or ignore the virtual reality content.

According to one example, a method for decoding and displaying virtual reality data is discussed. The method may include receiving a file containing virtual reality data, wherein the virtual reality data represents a 360-degree view of a virtual environment, extracting the virtual reality data from the file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box, extracting a sample entry from the track box, wherein the sample entry is associated with one or more samples, wherein the sample entry indicates that the track is a timed metadata track that contains information on a most-viewed viewport associated with the virtual reality data, and decoding and rendering the virtual reality data for display to a user. The information on the most-viewed viewport associated with the virtual reality data may comprise data identifying a shape type and data identifying a spherical region viewport specified by four great circles. The information on the most-viewed viewport associated with the virtual reality data may comprise data identifying a shape type and data identifying a spherical rectangle viewport specified by two yaw circles and two pitch circles. The most-viewed viewport may be associated with a presentation time of the virtual reality data to the user. The most-viewed viewport associated with the virtual reality data may be selected from the group consisting of: a viewport fully covered by a set of most-requested picture regions based on measurements of viewing statistics of the virtual reality data at the presentation time, a recommended viewport for displaying the virtual reality data, a default viewport absent user control over a viewing orientation of the virtual reality data, a director-defined viewport of the virtual reality data, and a producer-defined viewport of the virtual reality data. Extracting the virtual reality data from the files may comprise extracting the virtual reality data from the one or more media tracks of the file. The virtual reality data may be rendered and displayed using the information on the most-viewed viewport associated with the virtual reality data. The file format may be based on an International Standards Organization (ISO) base media file format.

According to another example, an apparatus for decoding and displaying virtual reality data is discussed. The apparatus may include a receiver configured to receive a file containing virtual reality data, wherein the virtual reality data represents a 360-degree view of a virtual environment, and a processor configured to, extract the virtual reality data from the file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box, extract a sample entry from the track box, wherein the sample entry is associated with one or more samples, wherein the sample entry indicates that the track is a timed metadata track that contains information on a most-viewed viewport associated with the virtual reality data, and decode and render the virtual reality data for display to a user. The information on the most-viewed viewport may be associated with the virtual reality data comprises data identifying a shape type and data identifying a spherical region viewport specified by four great circles. The information on the most-viewed viewport may be associated with the virtual reality data comprises data identifying a shape type and data identifying a spherical rectangle viewport specified by two yaw circles and two pitch circles. The most-viewed viewport may be associated with a presentation time of the virtual reality data to the user. The most-viewed viewport associated with the virtual reality data may be selected from the group consisting of: a viewport fully covered by a set of most-requested picture regions based on measurements of viewing statistics of the virtual reality data at the presentation time, a recommended viewport for displaying the virtual reality data, a default viewport absent user control over a viewing orientation of the virtual reality data, a director-defined viewport of the virtual reality data, and a producer-defined viewport of the virtual reality data. Extracting the virtual reality data from the files may comprise extracting the virtual reality data from the one or more media tracks of the file. The virtual reality data may be rendered and displayed using the information on the most-viewed viewport associated with the virtual reality data. The file format may be based on an International Standards Organization (ISO) base media file format.

According to another example, a method of storing virtual reality data is discussed. The method may include obtaining virtual reality data, wherein the virtual reality data represents a 360-degree view of a virtual environment, storing the virtual reality data into a file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box, and storing a sample entry from the track box, wherein the sample entry is associated with one or more samples, wherein the sample entry indicates that the track is a timed metadata track that contains information on a most-viewed viewport associated with the virtual reality data. The information on the most-viewed viewport may be associated with the virtual reality data comprises data identifying a shape type and data identifying a spherical region viewport specified by four great circles. The information on the most-viewed viewport may be associated with the virtual reality data comprises data identifying a shape type and data identifying a spherical rectangle viewport specified by two yaw circles and two pitch circles. The most-viewed viewport may be associated with a presentation time of the virtual reality data to a user. The most-viewed viewport associated with the virtual reality data may be selected from the group consisting of: a viewport fully covered by a set of most-requested picture regions based on measurements of viewing statistics of the virtual reality data at the presentation time, a recommended viewport for displaying the virtual reality data, a default viewport absent user control over a viewing orientation of the virtual reality data, a director-defined viewport of the virtual reality data, and a producer-defined viewport of the virtual reality data. Extracting the virtual reality data from the files may comprise extracting the virtual reality data from the one or more media tracks of the file. The file format may be based on an International Standards Organization (ISO) base media file format.

According to another example, an apparatus for storing virtual reality data is discussed. The apparatus may include a receiver configured to obtain virtual reality data, wherein the virtual reality data represents a 360-degree view of a virtual environment, and a processor configured to, store the virtual reality data into a file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box, and store a sample entry from the track box, wherein the sample entry is associated with one or more samples, wherein the sample entry indicates that the track is a timed metadata track that contains information on a most-viewed viewport associated with the virtual reality data. The information on the most-viewed viewport may be associated with the virtual reality data comprises data identifying a shape type and data identifying a spherical region viewport specified by four great circles. The information on the most-viewed viewport may be associated with the virtual reality data comprises data identifying a shape type and data identifying a spherical rectangle viewport specified by two yaw circles and two pitch circles. The most-viewed viewport may be associated with a presentation time of the virtual reality data to a user. The most-viewed viewport may be associated with the virtual reality data is selected from the group consisting of: a viewport fully covered by a set of most-requested picture regions based on measurements of viewing statistics of the virtual reality data at the presentation time, a recommended viewport for displaying the virtual reality data, a default viewport absent user control over a viewing orientation of the virtual reality data, a director-defined viewport of the virtual reality data, and a producer-defined viewport of the virtual reality data. Extracting the virtual reality data from the files may comprise extracting the virtual reality data from the one or more media tracks of the file. The file format may be based on an International Standards Organization (ISO) base media file format.

According to another example, a non-transitory computer-readable medium containing instructions for causing a computer to perform a method is discussed. The method may include receiving a file containing virtual reality data, wherein the virtual reality data represents a 360-degree view of a virtual environment, extracting the virtual reality data from the file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box, extracting a sample entry from the track box, wherein the sample entry is associated with one or more samples, wherein the sample entry indicates that the track is a timed metadata track that contains information on a most-viewed viewport associated with the virtual reality data, and decoding and rendering the virtual reality data for display to a user. The information on the most-viewed viewport associated with the virtual reality data may comprise data identifying a shape type and data identifying a spherical region viewport specified by four great circles. The information on the most-viewed viewport associated with the virtual reality data may comprise data identifying a shape type and data identifying a spherical rectangle viewport specified by two yaw circles and two pitch circles. The most-viewed viewport may be associated with a presentation time of the virtual reality data to the user. The most-viewed viewport associated with the virtual reality data may be selected from the group consisting of: a viewport fully covered by a set of most-requested picture regions based on measurements of viewing statistics of the virtual reality data at the presentation time, a recommended viewport for displaying the virtual reality data, a default viewport absent user control over a viewing orientation of the virtual reality data, a director-defined viewport of the virtual reality data, and a producer-defined viewport of the virtual reality data. Extracting the virtual reality data from the files may comprise extracting the virtual reality data from the one or more media tracks of the file. The virtual reality data may be rendered and displayed using the information on the most-viewed viewport associated with the virtual reality data. The file format may be based on an International Standards Organization (ISO) base media file format.

According to another example, an apparatus for decoding and displaying virtual reality data is discussed. The apparatus may include a receiver means configured to receive a file containing virtual reality data, wherein the virtual reality data represents a 360-degree view of a virtual environment, and a processor means configured to, extract the virtual reality data from the file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box, extract a sample entry from the track box, wherein the sample entry is associated with one or more samples, wherein the sample entry indicates that the track is a timed metadata track that contains information on a most-viewed viewport associated with the virtual reality data, and decode and render the virtual reality data for display to a user. The information on the most-viewed viewport may be associated with the virtual reality data comprises data identifying a shape type and data identifying a spherical region viewport specified by four great circles. The information on the most-viewed viewport may be associated with the virtual reality data comprises data identifying a shape type and data identifying a spherical rectangle viewport specified by two yaw circles and two pitch circles. The most-viewed viewport may be associated with a presentation time of the virtual reality data to the user. The most-viewed viewport associated with the virtual reality data may be selected from the group consisting of: a viewport fully covered by a set of most-requested picture regions based on measurements of viewing statistics of the virtual reality data at the presentation time, a recommended viewport for displaying the virtual reality data, a default viewport absent user control over a viewing orientation of the virtual reality data, a director-defined viewport of the virtual reality data, and a producer-defined viewport of the virtual reality data. Extracting the virtual reality data from the files may comprise extracting the virtual reality data from the one or more media tracks of the file. The virtual reality data may be rendered and displayed using the information on the most-viewed viewport associated with the virtual reality data. The file format may be based on an International Standards Organization (ISO) base media file format.

According to another example, a non-transitory computer-readable medium containing instructions for causing a computer to perform a method is discussed. The method may include obtaining virtual reality data, wherein the virtual reality data represents a 360-degree view of a virtual environment, storing the virtual reality data into a file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box, and storing a sample entry from the track box, wherein the sample entry is associated with one or more samples, wherein the sample entry indicates that the track is a timed metadata track that contains information on a most-viewed viewport associated with the virtual reality data. The information on the most-viewed viewport may be associated with the virtual reality data comprises data identifying a shape type and data identifying a spherical region viewport specified by four great circles. The information on the most-viewed viewport may be associated with the virtual reality data comprises data identifying a shape type and data identifying a spherical rectangle viewport specified by two yaw circles and two pitch circles. The most-viewed viewport may be associated with a presentation time of the virtual reality data to a user. The most-viewed viewport associated with the virtual reality data may be selected from the group consisting of: a viewport fully covered by a set of most-requested picture regions based on measurements of viewing statistics of the virtual reality data at the presentation time, a recommended viewport for displaying the virtual reality data, a default viewport absent user control over a viewing orientation of the virtual reality data, a director-defined viewport of the virtual reality data, and a producer-defined viewport of the virtual reality data. Extracting the virtual reality data from the files may comprise extracting the virtual reality data from the one or more media tracks of the file. The file format may be based on an International Standards Organization (ISO) base media file format.

According to another example, an apparatus for storing virtual reality data is discussed. The apparatus may include a receiver means configured to obtain virtual reality data, wherein the virtual reality data represents a 360-degree view of a virtual environment, and a processor means configured to, store the virtual reality data into a file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box, and store a sample entry from the track box, wherein the sample entry is associated with one or more samples, wherein the sample entry indicates that the track is a timed metadata track that contains information on a most-viewed viewport associated with the virtual reality data. The information on the most-viewed viewport may be associated with the virtual reality data comprises data identifying a shape type and data identifying a spherical region viewport specified by four great circles. The information on the most-viewed viewport may be associated with the virtual reality data comprises data identifying a shape type and data identifying a spherical rectangle viewport specified by two yaw circles and two pitch circles. The most-viewed viewport may be associated with a presentation time of the virtual reality data to a user. The most-viewed viewport may be associated with the virtual reality data is selected from the group consisting of: a viewport fully covered by a set of most-requested picture regions based on measurements of viewing statistics of the virtual reality data at the presentation time, a recommended viewport for displaying the virtual reality data, a default viewport absent user control over a viewing orientation of the virtual reality data, a director-defined viewport of the virtual reality data, and a producer-defined viewport of the virtual reality data. Extracting the virtual reality data from the files may comprise extracting the virtual reality data from the one or more media tracks of the file. The file format may be based on an International Standards Organization (ISO) base media file format.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
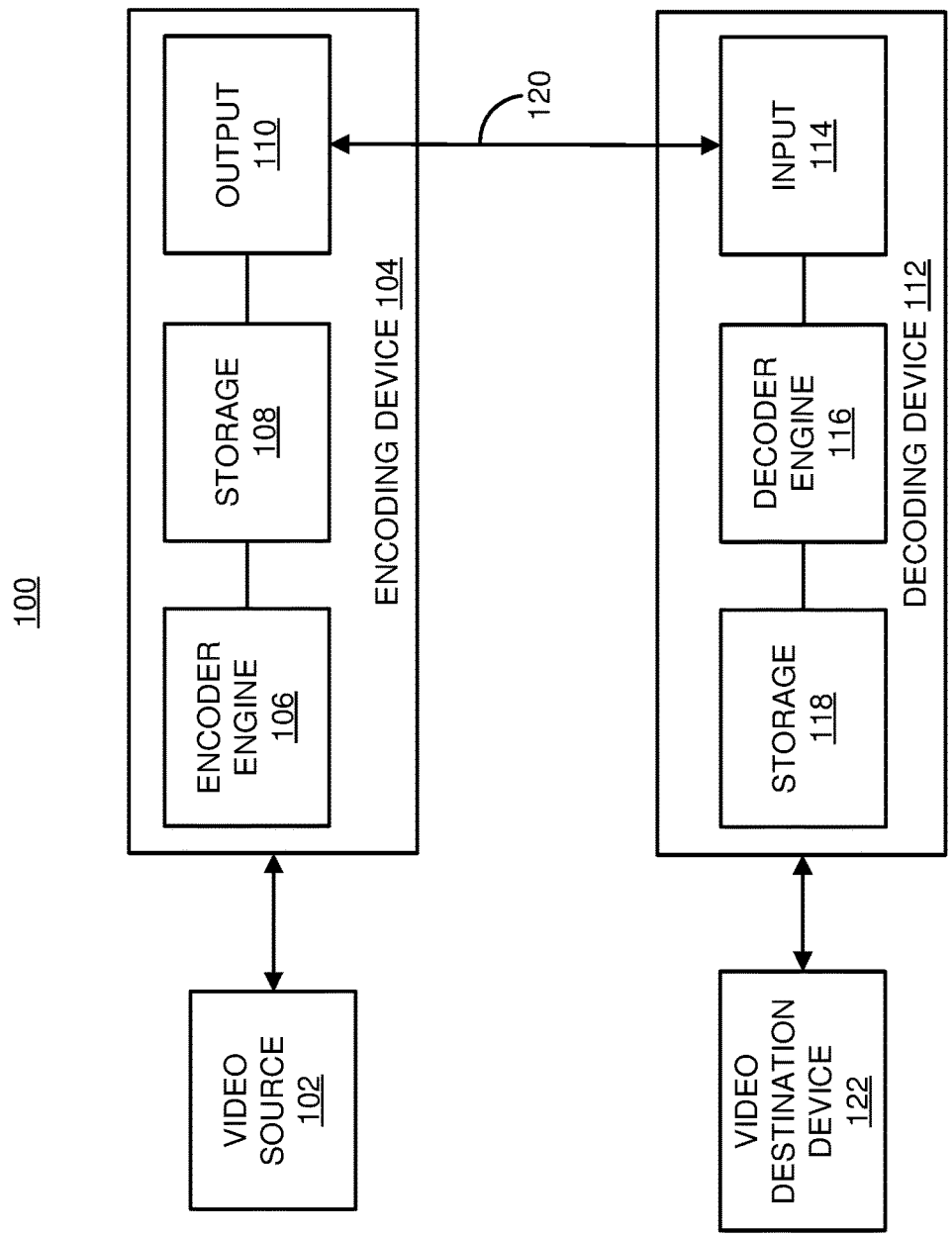
FIG. 1 is a block diagram illustrating an example of a system including an encoding device and a decoding device.

A mechanism to signal a most-viewed viewport in a virtual reality content. The most-viewed viewport may be a viewport fully covered by a set of most-requested picture regions. The most-requested picture regions may be statistically more likely to be requested or rendered for a user at a presentation. For example, such regions may include regions of high user interest within the virtual reality content at the presentation time. In another implementation, the most-requested viewport may be a viewport that should be displayed when the user does not have control or has released control of a viewing orientation. The most-requested picture regions metadata and the corresponding most-viewed viewport metadata can be associated with each other and help a video display device understand which region on the spherical surface of the virtual reality content has been most requested and viewed.

A new type of sample entry can be defined, for example, indicated by the 4CC 'mvvp'. This indicates that the track is a timed metadata track containing information on a most-viewed viewport. Various types of viewports can be indicated, such as a spherical region specified by four great circles, or a spherical region specified by two yaw circles and two pitch circles.

Virtual reality (VR) describes a three-dimensional, computer-generated environment that can be interacted within a seemingly real or physical way. Generally, a user experiencing a virtual reality environment uses electronic equipment, such as a head-mounted display (HMD) and optionally also clothing (e.g., gloves fitted with sensors), to interact with the virtual environment. As the user moves in the real world, images rendered in the virtual environment also change, giving the user the perception that the user is moving within the virtual environment. In some cases, the virtual environment includes sound that correlates with the movements of the user, giving the user the impression that the sounds originate from a particular direction or source. Virtual reality video can be captured and rendered at very high quality, potentially providing a truly immersive virtual reality experience. Virtual reality applications include gaming, training, education, sports video, and online shopping, among others.

A virtual reality system typically includes a video capture device and a video display device, and possibly also other intermediate devices such as servers, data storage, and data transmission equipment. A video capture device may include a camera set, that is, a set of multiple cameras, each oriented in a different direction and capturing a different view. As few as six cameras can be used to capture a full 360-degree view centered on the camera set's location. Some video capture devices may use fewer cameras, such as, for example, video capture devices that capture primarily side-to-side views. A video generally includes frames, where a frame is an electronically coded still image of a scene. Cameras capture a certain number of frames per second, which is usually referred to as the camera's frame rate.

To provide a seamless 360-degree view, the video captured by each of the cameras in the camera set typically undergoes image stitching. Image stitching in the case of 360-degree video generation involves combining or merging video frames from adjacent cameras in the area where the video frames overlap or would otherwise connect. The result would be an approximately spherical frame, but similar to a Mercator projection, the merged data is typically represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices generally operate on a raster principle—meaning that a video frame is treated as a grid of pixels—thus square or rectangular planes are typically used to represent a spherical environment.

Virtual reality video frames, mapped to a planar representation, can be encoded and/or compressed for storage and/or transmission. Encoding and/or compression can be accomplished using a video codec (e.g., a H.265/HEVC compliant codec, a H.264/AVC compliant codec, or other suitable codec) and results in a compressed video bitstream or group of bitstreams. Encoding of video data using a video codec is described in further detail below.

The encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a virtual reality system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. The receiver device can support the media or file format that was used to pack the video bitstream into a file (or files), extract the video (and possibly also audio) data, to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device).

Rendering devices include, for example, head-mounted displays, virtual reality televisions, and other 180 or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device may render a video at the same frame rate at which the video was captured, or at a different frame rate.

File format standards can define the format for packing and unpacking video (and possibly also audio) data into one or more files. File format standards include International Organization for Standardization (ISO) base media file format (ISOBMFF, defined in ISO/IEC 14496-12) and other file formats derived from the ISOBMFF, including Motion Pictures Experts Group (MPEG) MPEG-4 file format (defined in ISO/IEC 14496-15), 3rd Generation Partnership Project (3GPP) file format (defined in 3GPP TS 26.244) and Advanced Video Coding (AVC) file format and High Efficiency Video Coding (HEVC) file format (both defined in ISO/IEC 14496-15). The draft texts of recent new editions for ISO/IEC 14496-12 and 14496-15 are available at http://phenix.int-evry.fr/mpeg/doc_end_user/documents/111_Geneva/wg11/w15177-v6-w15177.zip and http://phenix.int-evry.fr/mpeg/doc_end_user/documents/112_Warsaw/wg11/w15479-v2-w15479.zip, respectively.

The ISOBMFF is used as the basis for many codec encapsulation formats (e.g., the AVC file format or any other suitable codec encapsulation format), as well as for many multimedia container formats (e.g., the MPEG-4 file format, the 3GPP file format (3GP), the DVB file format, or any other suitable multimedia container format). ISOBMFF-based file formats can be used for continuous media, which is also referred to as streaming media.

In addition to continuous media (e.g., audio and video), static media (e.g., images) and metadata can be stored in a file conforming to ISOBMFF. Files structured according to the ISOBMFF may be used for many purposes, including local media file playback, progressive downloading of a remote file, as segments for Dynamic Adaptive Streaming over HTTP (DASH), as containers for content to be streamed (in which case the containers include packetization instructions), for recording of received real-time media streams, or other uses.

The ISOBMFF and its derived file formats (e.g., the AVC file format or other derived file formats) are widely used for storage and encapsulation of media content (e.g., including video, audio, and timed text) in many multimedia applications. The ISOBMFF and file formats derived from ISOBMFF do not, however, include specifications for storing virtual reality (VR) video. For example, if a virtual reality video is stored in a file based on ISOBMFF or a derived file format, a player device may treat (e.g., may attempt to process) the virtual reality video as a conventional planar video (e.g., the player device may treat the virtual reality video as not including virtual reality content). The player may thus not apply the necessary projection of the virtual reality video during rendering, resulting in the video being distorted and potentially unviewable when displayed.

In various implementations, modifications and/or additions to the ISOBMFF can indicate that a file that has been formatted according to the ISOBMFF, or a format derived from the ISOBMFF, includes virtual reality content. For example, in some implementations, a file can include a file-level indication, which signals (e.g., indicates) that the contents of the file are formatted for use in virtual reality use cases or implementations. As another example, in some implementations, a file can include a movie-level indication, which signals (e.g., indicates) that the movie presentation in the file includes virtual reality content. As another example, in some implementations, a file can include a track-level indication, which signals (e.g., indicates) that a track includes virtual reality content. In various implementations, parameter related to the virtual reality content can also be signalled at the file, movie, and/or track level.

In these and other implementations, player devices can recognize when a file includes virtual reality content. In some cases, player devices that are not capable of displaying virtual reality content can ignore and/or skip the virtual reality media.

Certain aspects and embodiments of this disclosure are discussed. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data, including virtual reality video data, using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its scalable video coding and multiview vide coding extensions, known as SVC and MVC, respectively. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Implementations described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source. One example of a video source 102 can include an Internet protocol camera (IP camera). An IP camera is a type of digital video camera that can be used for surveillance, home security, or other suitable application. Unlike analog closed circuit television (CCTV) cameras, an IP camera can send and receive data via a computer network and the Internet.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signalled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signalled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level. In some examples, the one or more slices of a picture are assigned a slice type. Slice types include an I slice, a P slice, and a B slice. An I slice (intra-frames, independently decodable) is a slice of a picture that is only coded by Intra prediction, and, therefore, is independently decodable since the I slice requires only the data within the frame to predict any block of the slice. A P slice (uni-directional predicted frames) is a slice of a picture that may be coded with intra-prediction and uni-directional inter-prediction. Each block within a P slice is either coded with Intra prediction or inter-prediction. When the inter-prediction applies, the block is only predicted by one reference picture, and, therefore, reference samples are only from one reference region of one frame. A B slice (bi-directional predictive frames) is a slice of a picture that may be coded with intra-prediction and inter-prediction. A block of a B slice may be bi-directional predicted from two reference pictures, where each picture contributes one reference region and sample sets of the two reference regions are weighted (e.g., with equal weights) to produce the prediction signal of the bi-directional predicted block. As explained above, slices of one picture are independently coded. In some cases, a picture can be coded as just one slice.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoding device 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

Supplemental Enhancement Information (SEI) messages can be included in video bitstreams. For example, SEI messages may be used to carry information (e.g., metadata) that is not essential in order to decode the bitstream by the decoding device 112. This information is useful in improving the display or processing of the decoded output (e.g. such information could be used by decoder-side entities to improve the viewability of the content).

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard. In general, a layer includes a set of VCL NAL units and a corresponding set of non-VCL NAL units. The NAL units are assigned a particular layer ID value. Layers can be hierarchical in the sense that a layer may depend on a lower layer.

As previously described, an HEVC bitstream includes a group of NAL units, including VCL NAL units and non-VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

VCL NAL units include coded picture data forming the coded video bitstream. Various types of VCL NAL units are defined in the HEVC standard, as illustrated in Table A below. In a single-layer bitstream, as defined in the first HEVC standard, VCL NAL units contained in an AU have the same NAL unit type value, with the NAL unit type value defining the type of AU and the type of coded picture within the AU. For example, VCL NAL units of a particular AU may include instantaneous decoding refresh (IDR) NAL units (value 19), making the AU an IDR AU and the coded picture of the AU an IDR picture. The given type of a VCL NAL unit is related to the picture, or portion thereof, contained in the VCL NAL unit (e.g., a slice or slice segment of a picture in a VCL NAL unit). Three classes of pictures are defined in the HEVC standard, including leading pictures, trailing pictures, and intra random access (IRAP) pictures (also referred to as "random access pictures"). In a multi-layer bitstream, VCL NAL units of a picture within an AU have the same NAL unit type value and the same type of coded picture. For example, the picture that contains VCL NAL units of type IDR is said to be an IDR picture in the AU. In another example, when an AU contains a picture that is an IRAP picture at the base layer (the layer ID equal to 0), the AU is an IRAP AU.

A video bitstream encoded as discussed above can be written or packed into one or more files in order to transfer the bitstream from the encoding device 104 to the decoding device 112. For example, the output 110 may include a file writing engine, configured to generate one or more files that contain the bitstream. The output 110 can transmit the one or more files over the communications link 120 to the decoder device 112. Alternatively or additionally, the one or more files can be stored on a storage medium (e.g., a tape, a magnetic disk, or a hard drive, or some other medium) for later transmission to the decoding device 112.

The decoder device 112 can include, for example in the input 114, a file parsing engine. The file parsing engine can read files received over the communications link 120 or from a storage medium. The file parsing engine can further extract samples from the file, and reconstruct the bitstream for decoding by the decoder engine 116. In some cases, the reconstructed bitstream can be the same as the bitstream generated by the encoder engine 106. In some cases, the encoder engine 106 may have generated the bitstream with several possible options for decoding the bitstream, in which case the reconstructed bitstream may include only one or fewer than all the possible options.

A video bitstream encoded as discussed above can be written or packed into one or more files using the ISOBMFF, a file format derived from the ISOBMFF, some other file format, and/or a combination of file formats including the ISOBMFF. The file or files can be played back using a video player device, can be transmitted and then displayed, and/or be stored.

Figure 2:
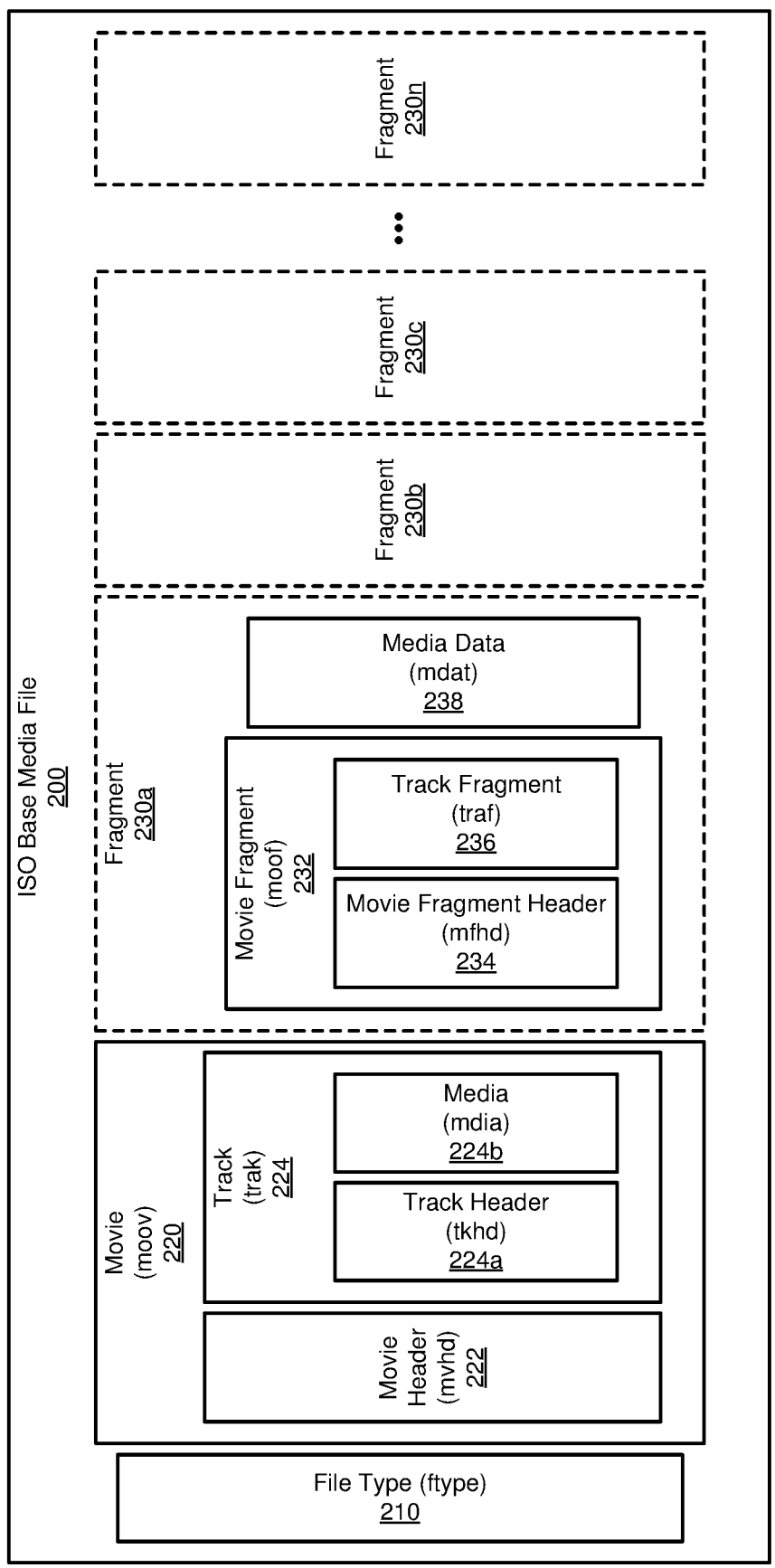
FIG. 2 illustrates an example of an ISO base media file that contains data and metadata for a video presentation, formatted according to the ISOBMFF.

FIG. 2 illustrates an example of an ISO base media file 200 that contains data and metadata for a video presentation, formatted according to the ISOBMFF. The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism.

A "presentation," as defined by the ISOBMFF specification, is a sequence of pictures, often related by having been captured sequentially by a video capture device, or related for some other reason. Herein, a presentation may also be referred to as a movie or a video presentation. A presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. Boxes generally include a header that provides a size and a type for the box. The size describes the entire size of the box, including the header, fields, and all boxes contained within the box. Boxes with a type that is not recognized by a player device are typically ignored and skipped.

As illustrated by the example of FIG. 2, at the top level of the file, an ISO base media file 200 can include a file type box 210, a movie box 220, and one or more movie fragment boxes 230a, 230n. Other boxes that can be included at this level but that are not represented in this example include free space boxes, metadata boxes, and media data boxes, among others.

An ISO base media file can include a file type box 210, identified by the box type "ftyp." The file type box 210 identifies an ISOBMFF specification that is the most suitable for parsing the file. "Most" in this instance means that the ISO base media file 200 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. The file type box 210 can also include a version number, which can be used to indicate a version of the ISOBMFF specification. The file type box 210 can also include a list of compatible brands, which includes a list of others brands with which the file is compatible. An ISO base media file can be compatible with more than one major brand.

When an ISO base media file 200 includes a file type box 210, there is only one file type box. An ISO base media file 200 may omit the file type box 210 in order to be compatible with older player devices. When an ISO base media file 200 does not include a file type box 210, a player device can assume a default major brand (e.g. "mp41"), minor version (e.g., "0"), and compatible brand (e.g., "mp41"). The file type box 210 is typically placed as early as possible in the ISO base media file 200.

An ISO base media file can further include a movie box 220, which contains the metadata for the presentation. The movie box 220 is identified by the box type "moov." ISO/IEC 14496-12 provides that a presentation, whether contained in one file or multiple files, can include only one movie box 220. Frequently, the movie box 220 is near the beginning of an ISO base media file. The movie box 220 includes a movie header box 222, and can include one or more track boxes 224 as well as other boxes.

The movie header box 222, identified by the box type "mvhd," can include information that is media-independent and relevant to the presentation as a whole. For example, the movie header box 222 can include information such as a creation time, a modification time, a timescale, and/or a duration for the presentation, among other things. The movie header box 222 can also include an identifier that identifies the next track in the presentation. For example, the identifier can point to the track box 224 contained by the movie box 220 in the illustrated example.

The track box 224, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the illustrated example, the example track box 224 includes a track header box 224a and a media box 224b. A track box can include other boxes, such as a track reference box, a track group box, an edit box, a user data box, a meta box, and others.

The track header box 224a, identified by the box type "tkhd," can specify the characteristics of a track contained in the track box 224. For example, the track header box 224a can include a creation time, modification time, duration, track identifier, layer identifier, group identifier, volume, width, and/or height of the track, among other things. For a media track, the track header box 224a can further identify whether the track is enabled, whether the track should be played as part of the presentation, or whether the track can be used to preview the presentation, among other things. Presentation of a track is generally assumed to be at the beginning of a presentation. The track box 224 can include an edit list box, not illustrated here, that can include an explicit timeline map. The timeline map can specify, among other things, an offset time for the track, where the offset indicates a start time, after the beginning of the presentation, for the track.

In the illustrated example, the track box 224 also includes a media box 224b, identified by the box type "mdia." The media box 224b can contain the objects and information about the media data in the track. For example, the media box 224b can contain a handler reference box, which can identify the media type of the track and the process by which the media in the track is presented. As another example, the media box 224b can contain a media information box, which can specify the characteristics of the media in the track. The media information box can further include a table of samples, where each sample describes a chunk of media data (e.g., video or audio data) including, for example, the location of the data for the sample. The data for a sample is stored in a media data box, discussed further below. As with most other boxes, the media box 224b can also include a media header box.

In the illustrated example, the example ISO base media file 200 also includes multiple fragments 230a, 230b, 230c, 230n of the presentation. The fragments 230a, 230b, 203c, 230n are not ISOBMFF boxes, but rather describe a movie fragment box 232 and the media data box 238 that is referenced by the movie fragment box 232. The movie fragment box 232 and media data boxes 238 are top-level boxes, but are grouped here to indicate the relationship between a movie fragment box 232 and a media data box 238.

A movie fragment box 232, identified by the box type "moof," can extend a presentation by including additional information that would otherwise be stored in the movie box 220. Using movie fragment boxes 232, a presentation can be built incrementally. A movie fragment box 232 can include a movie fragment header box 234 and a track fragment box 236, as well as other boxes not illustrated here.

The movie fragment header box 234, identified by the box type "mfhd," can include a sequence number. A player device can use the sequence number to verify that the fragment 230a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 232 can also include one or more track fragment boxes 236, identified by the box type "traf." A movie fragment box 232 can include a set of track fragments, zero or more per track. The track fragments can contain zero or more track runs, each of which describes a contiguous run of samples for a track. Track fragments can be used to add empty time to a track, in addition to adding samples to the track.

The media data box 238, identified by the box type "mdat," contains media data. In video tracks, the media data box 238 would contain video frames. A media data box can alternatively or additionally include audio data. A presentation can include zero or more media data boxes, contained in one or more individual files. The media data is described by metadata. In the illustrated example, the media data in the media data box 238 can be described by metadata included in the track fragment box 236. In other examples, the media data in a media data box can be described by metadata in the movie box 220. The metadata can refer to a particular media data by an absolute offset within the file 200, such that a media data header and/or free space within the media data box 238 can be skipped.

Other fragments 230b, 230c, 230n in the ISO base media file 200 can contain boxes similar to those illustrated for the first fragment 230a, and/or can contain other boxes.

The ISOBMFF includes support for streaming media data over a network, in addition to supporting local playback of the media. The file or files that include one movie presentation can include additional tracks, called hint tracks, which contain instructions that can assist a streaming server in forming and transmitting the file or files as packets. These instructions can include, for example, data for the server to send (e.g., header information) or references to segments of the media data. A file can include separate hint tracks for different streaming protocols. Hint tracks can also be added to a file without needing to reformat the file.

One method for streaming media data is Dynamic Adaptive Streaming over HyperText Transfer Protocol (HTTP), or DASH (defined in ISO/IEC 23009-1:2014). DASH, which is also known as MPEG-DASH, is an adaptive bitrate streaming technique that enables high quality streaming of media content using conventional HTTP web servers. DASH operates by breaking the media content into a sequence of small HTTP-based file segments, where each segment contains a short time interval of the content. Using DASH, a server can provide the media content at different bit rates. A client device that is playing the media can select among the alternative bit rates when downloading a next segment, and thus adapt to changing network conditions. DASH uses the HTTP web server infrastructure of the Internet to deliver content over the World Wide Web. DASH is independent of the codec used to encode and decode the media content, and thus operates with codecs such as H.264 and HEVC, among others.

The ISOBMFF specification specifies six types of Stream Access Points (SAPs) for use with DASH. The first two SAP types (types 1 and 2) correspond to instantaneous decoding refresh (IDR) pictures in H.264/AVC and HEVC. For example, an IDR picture is an intra-picture (I-picture) that completely refreshes or reinitializes the decoding process at the decoder and starts a new coded video sequence. In some examples, an IDR picture and any picture following the IDR picture in decoding order cannot be dependent on any picture that comes before the IDR picture in decoding order.

The third SAP type (type 3) corresponds to open-GOP (Group of Pictures) random access points, hence broken link access (BLA) or clean random access (CRA) pictures in HEVC. For example, a CRA picture is also an I-picture. A CRA picture may not refresh the decoder and may not begin a new CVS, allowing leading pictures of the CRA picture to depend on pictures that come before the CRA picture in decoding order. Random access may be done at a CRA picture by decoding the CRA picture, leading pictures associated with the CRA picture that are not dependent on any picture coming before the CRA picture in decoding order, and all associated pictures that follow the CRA in both decoding and output order. In some cases, a CRA picture may not have associated leading pictures. In some embodiments, in the multi-layer case, an IDR or a CRA picture that belongs to a layer with layer ID greater than 0 may be a P-picture or a B-picture, but these pictures can only use inter-layer prediction from other pictures that belong to the same access unit as the IDR or CRA picture, and that have a layer ID less than the layer containing the IDR or CRA picture.

The fourth SAP type (type 4) corresponds to gradual decoding refresh (GDR) random access points.

The ISOBMFF, while flexible and extensible and widely used to store and transmit various types of media, does not include mechanisms for storing virtual reality video or identifying the contents of an ISO base media file as including virtual reality content. Player devices may thus not be able to determine that the contents of a file include virtual reality video. Player devices that are not capable of displaying virtual reality content may attempt to display the content anyway, resulting in a distorted presentation.

In various implementations, the ISOBMFF and/or file formats derived from the ISOBMFF can be modified and/or extended so that virtual reality content can be identified. These implementations can involve boxes, brand values, reserved bits in a box, and/or other indicators that can each independently or in combination identify virtual reality content.

Figure 3A:
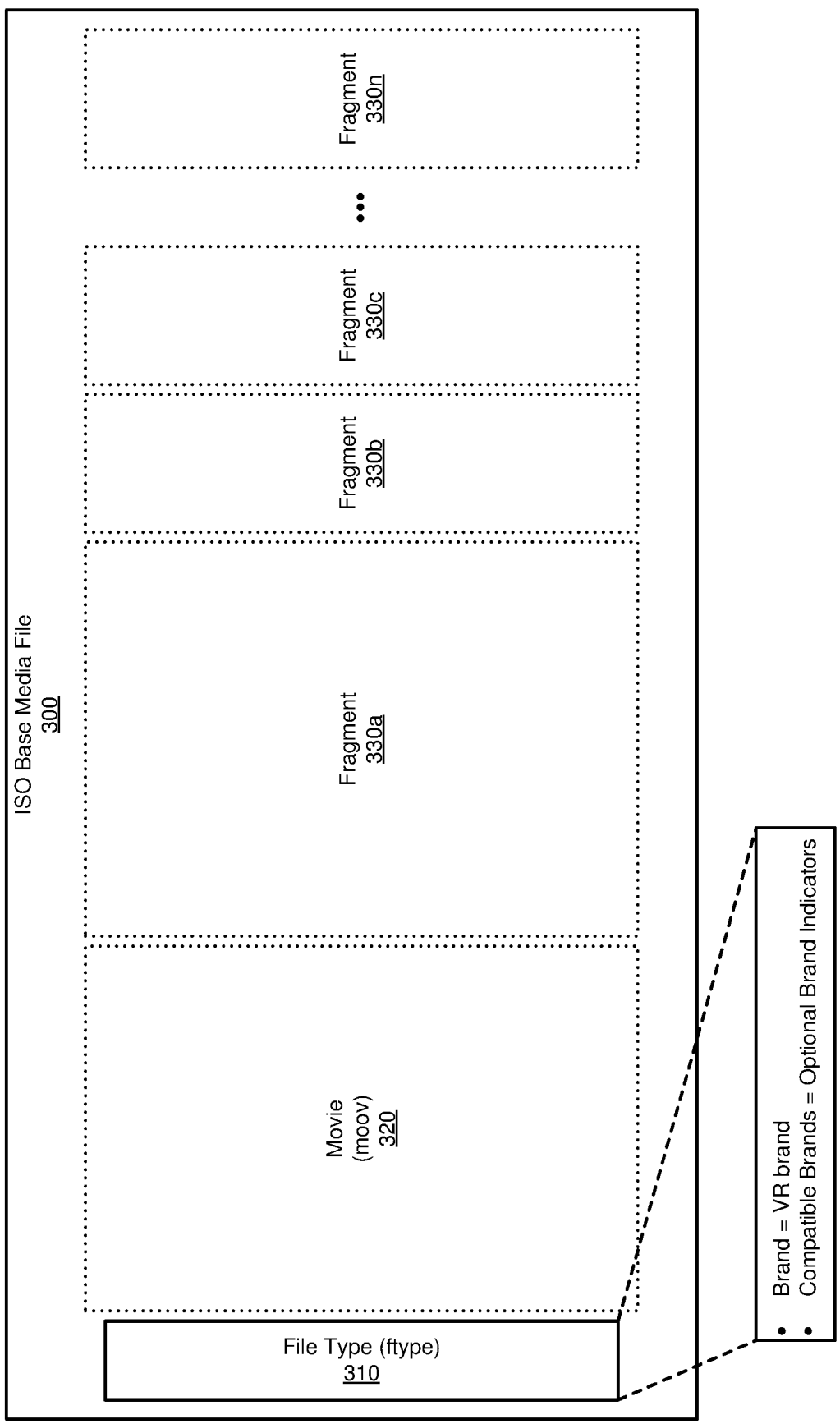
FIG. 3A and FIG. 3B illustrate examples where a top-level box in an ISO base media file is used to indicate that the file includes virtual reality content.
Figure 3B:
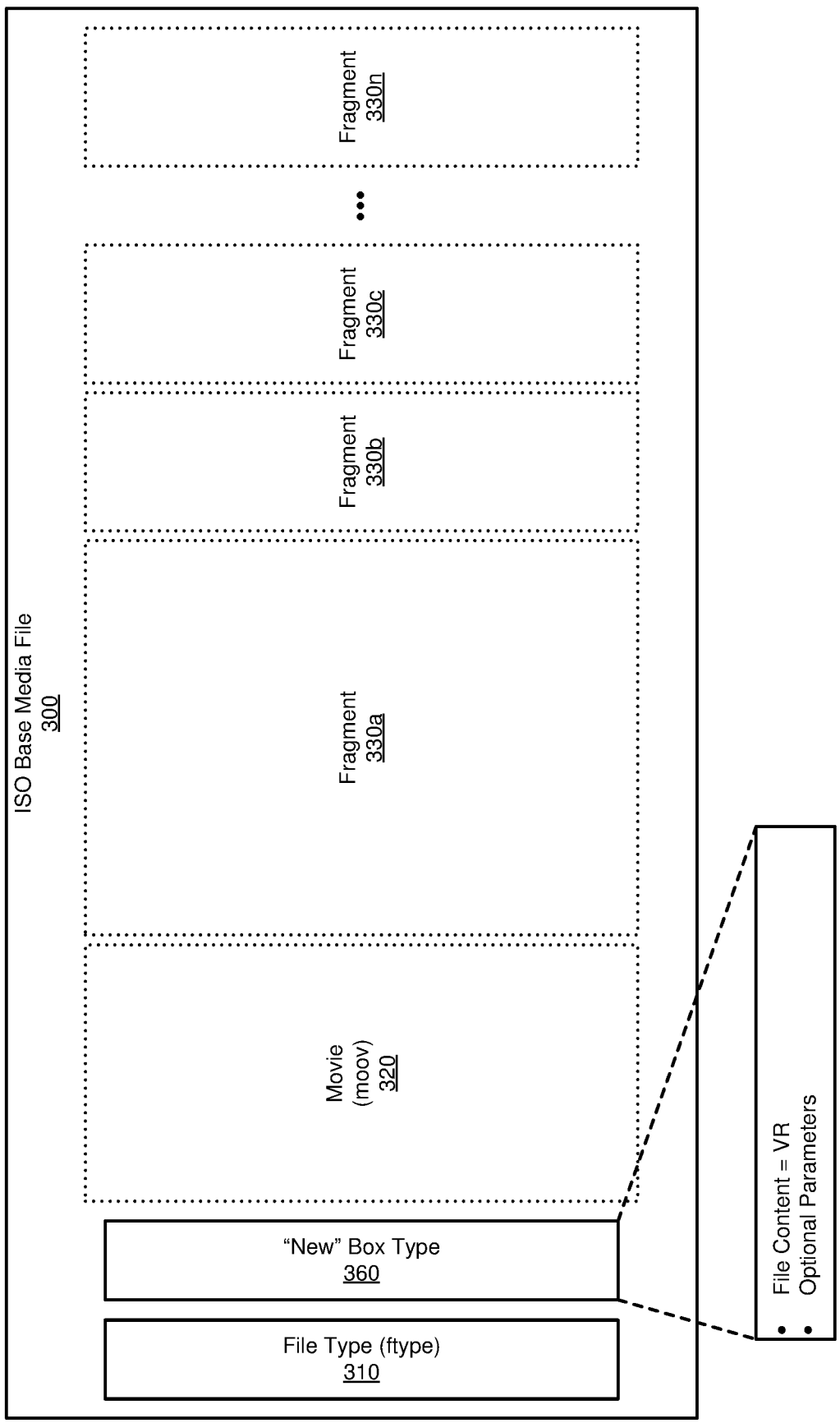

FIG. 3A and FIG. 3B illustrate examples where a top-level box in an ISO base media file 300 is used to indicate that the file 300 includes virtual reality content. In various implementations, using a top-level box indicates that all of the content in the file 300 is virtual reality content. The file 300 can include a file type box 310, which can specify the brand(s) or particular iterations of the ISOBMFF or derivations of the ISOBMFF with which the file 300 is compatible. The file 300 can also include a movie box 320, which can contain the metadata for a presentation. The file 300 can optionally also include one or more fragments 330a, 330b, 330c, 330n, as discussed above.

In the example of FIG. 3A, the file type box 310 can be used to indicate that the file 300 includes virtual reality content. The file type box 310 can be used, for example, to specify a brand value that indicates that the file is compatible with a virtual reality brand. In various implementations, the compatible brands listed in the file type box 310 can also be used to provide optional brand indicators, which can be used to provide virtual-reality related parameters. For example, one compatible brand value can indicate that the virtual reality content is 2-dimensional (2-D) while another compatible brand value can indicate that the virtual reality content is 3-dimensional (3-D). As another example, compatible brand values can be used to indicate a mapping type; that is, whether the spherical representation of the virtual reality video has been mapped to an equirectangular, cube, or pyramid format, or some other format for storage in the file 300. In various implementations, information such as the dimensionality and/or mapping of the video can alternatively or additionally be indicated using optional fields in the file type box 310.

In the example of FIG. 3B, a new box type 360 has been defined. The new box type 360 is a top level box, similar to the file type box 310. Presence of the new box type 360 in the file, and/or indicators in the new box type 360 can be used to indicate that the file 300 includes virtual reality content. For example, the new box type 360 can specify a virtual reality-compatible brand value, and/or include brand value compatible with virtual reality content in a compatible brands list. The new box type 360 can further include optional parameters that can indicate, for example, whether the virtual reality content is 2-D or 3-D and/or a mapping for the virtual reality data stored in the file 300. Specifying the new box type 360 can avoid the need to modify the file type box 310, as in the example of FIG. 3A. Player devices that cannot recognize the new box type 360 may ignore it.

When the file type box 310 or a new box type 360 defined for the top level of the file is used to indicate that the file 300 includes virtual reality content, in some implementations, the file 300 may not also need to include indicators in other boxes in the file 300 to signal the presence of virtual reality content.

Figure 4:
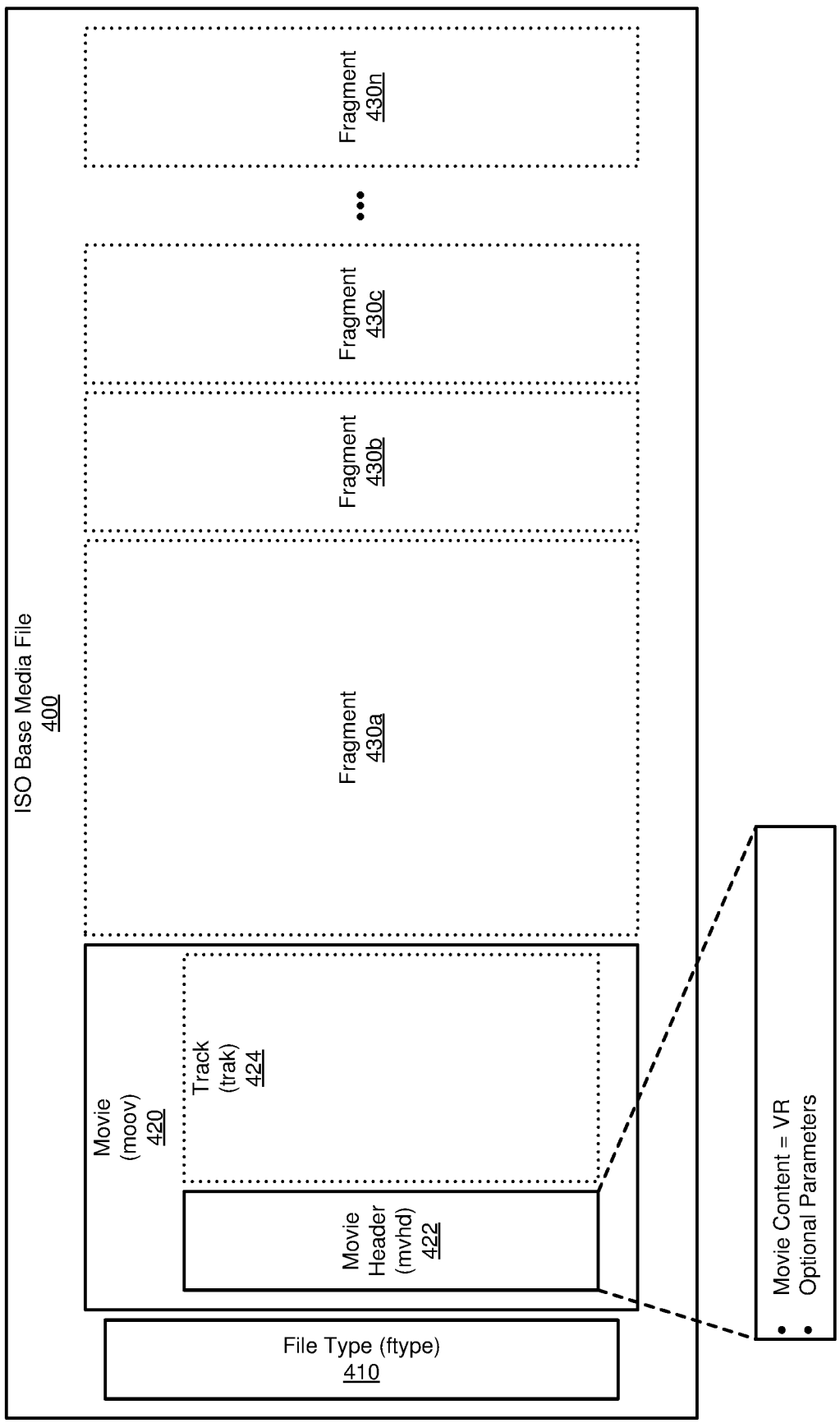
FIG. 4 illustrates an example where a movie-level indication is used in an ISO base media file 400 to indicate that the file includes virtual reality content.

FIG. 4 illustrates an example where a movie-level indication is used in an ISO base media file 400 to indicate that the file 400 includes virtual reality content. The file 400 can include a file type box 410, which can specify the brand(s) or particular iterations of the ISOBMFF or derivations of the ISOBMFF with which the file 400 is compatible. The file 400 can also include a movie box 420, which can contain the metadata for a presentation. The file 400 can optionally also include one or more fragments 430a, 430b, 430c, 430n, as discussed above.

As discussed above, the movie box 420 can include a movie header box 422 and optionally one or more track boxes 424. In the example of FIG. 4, the movie header box 422 is used to indicate that the movie or presentation described by the movie box 420 includes virtual reality content. For example, a reserved bit in the movie header box 422, when set to one value, can indicate that the movie content is virtual reality video, and can be set to another value when the movie may or may not be virtual reality video. In one illustrative example, if one of the reserved bits is used to convey the indication, the bit equal to 1 indicates that the content is virtual reality video content, and the bit equal to 0 indicates that the content may or may not be virtual reality video content. Player devices that are not configured to process the reserved bits may ignore these bits.

Other fields and/or reserved bits in the movie header box 422 can be used to provide optional parameters that pertain to the virtual reality content. For example, the movie header box 422 can include a parameter that indicates whether the virtual reality content is 2-D or 3D.

As another example, the movie header box 422 can include a parameter that indicates whether the virtual reality content is pre-stitched or post-stitched. "Pre-stitched" means that the different views captured for the virtual reality presentation were assembled into a single representation before being stored in the file 400 "Post-stitched" means that the different views were stored individually in the file 400, and will be assembled into a single representation by a decoder device.

Pre-stitched virtual reality video is typically represented as spherical in shape, and is mapped to another shape (e.g., equirectangular, cube mapped, pyramid mapped, or some other shape) that is more convenient for storage. Parameters that indicate the mapping type used are another example of parameters that can be signalled in the movie header box 422, for example, using reserved bits. For example, one reserved bit can be used to convey each mapping type indication. In various implementations, a player device can support multiple mapping types. In these implementations, the movie header box 422 can include a mapping type for each individual track and/or for groups of tracks.

When the movie header box 422 is used to indicate that the movie presentation stored in the movie box 420 includes virtual reality video, in various implementations, other boxes in the movie box 420 may not also need to signal the presence of virtual reality video.

Figure 5:
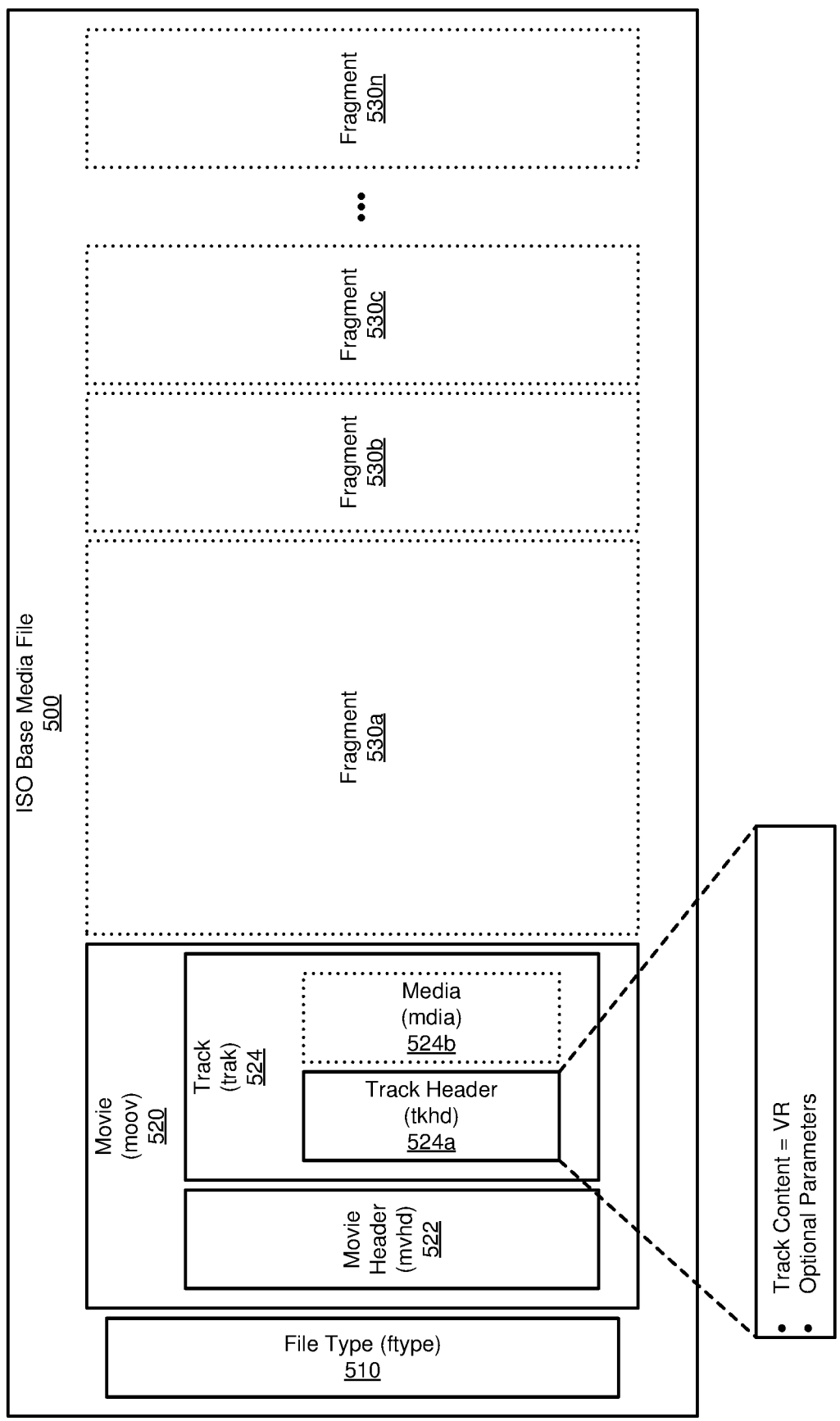
FIG. 5 illustrates an example where a track level indicator is used in an ISO base media file to indicate that the file includes virtual reality content.

FIG. 5 illustrates an example where a track level indicator is used in an ISO base media file 500 to indicate that the file 500 includes virtual reality content. The file 500 can include a file type box 510, which can specify the brand(s) or particular iterations of the ISOBMFF or derivations of the ISOBMFF with which the file 500 is compatible. The file 500 can also include a movie box 520, which can contain the metadata for a presentation. The file 500 can optionally also include one or more fragments 530a, 530b, 530c, 530n, as discussed above.

The movie box 520 can include a movie header box 522 and one or more track boxes 524, as well as other boxes not illustrated here. The movie header box 522 can include information that describes the presentation as a whole. The track box 524 can include the information for a track in the presentation. The track box 524 can include a track header box 524a and zero or more media data boxes 524b.

In the example of FIG. 5, the track header box 524a for a particular track box 524 is used to indicate that the track described by the track box 524 is a virtual reality track, meaning that samples referred to by the track include virtual reality video data. Virtual reality content in the track can be indicated, for example, using reserved bits in the track header box 524a. For example, when a particular reserved bit is set to one value, the track includes virtual reality content, and when the bit is set to another value, the track may or may not include virtual reality content. In one illustrative example, if one of the reserved bits is used to convey the indication, the bit equal to 1 indicates that the content is virtual reality video content, and the bit equal to 0 indicates that the content may or may not be virtual reality video content. In some implementations, the signaling of virtual reality content in the track header box 524 may depend on what is signalled in the movie header box 522. For example, when the movie header box 622 indicates that the movie does not include virtual reality content, then any indication in the track header box 524a that the track contains virtual reality data can be ignored.

In various implementations, other virtual reality-related parameters can also be signalled in the track header box 524a. For example, a reserved bit or some other variable can be used to indicate whether the virtual reality video in the track is pre-stitched or post-stitched. When the video in the track is pre-stitched, additional parameters can provide information such as a camera position (e.g., with respect to a point of view and/or viewing angle). When the video in the track is post-stitched, additional parameters can provide a mapping type between the spherical video representation and the representation (e.g., equirectangular, cube map, pyramid map, or some other shape) used to store the data in the file 500.

When the track header box 524a for a track box 524 is used to signal that the track includes virtual reality content, in some implementations, other boxes in the track box 524 may not need also signal the presence of virtual reality content in the track.

In various implementations, techniques similar to those discussed above can be used to indicate virtual reality content in a file transmitted using DASH. For example, virtual reality content can be signalled at the media presentation level of a DASH presentation. A media presentation, as defined by the DASH specification, is a collection of data for a bounded or unbounded media presentation (e.g., a single motion picture or continuous live stream, among other examples). A media presentation can be described by a media presentation description, a document contains metadata that can be used by a DASH client to construct the appropriate HTTP uniform resource locators (URLs) to access segments of the media presentation.

In various implementations, the media presentation description can be used to indicate that the media content described by the media presentation description includes virtual reality content. For example, an element can be modified or added to the schema for the media presentation description, where the element then signals virtual reality content. In various implementations, attributes can also be modified or added to the media presentation description to provide information about the virtual reality content, such as whether the content is 2-D or 3-D, whether the content is pre-stitched or post-stitched, and/or a mapping for the video frames when the content is post-stitched. In some implementations, a virtual reality indicator in the media presentation description indicates that all of the content in the presentation is formatted for virtual reality.

In a DASH presentation, media content for one presentation is divided into periods. A period, as defined by DASH, is an interval of time within the media presentation. The presentation thus consists of a contiguous sequence of periods. Within a period, the media content typically has a consistent set of encodings, including having one average bitrate, one language, one caption setting, one subtitle setting, etc.

In various implementations, the elements and/or attributes of a period can be used to indicate virtual reality content. For example, an element can be modified or added to the schema for the period, where the element then signals virtual reality content. In various implementations, attributes can also be modified or added to the period to provide information about the virtual reality content, such as whether the content is 2-D or 3-D, whether the content is pre-stitched or post-stitched, and/or a mapping for the video frames when the content is post-stitched. In some implementations, a virtual reality indicator in the period indicates that the content in the period is formatted for virtual reality.

Within a period, content can be arranged into adaptation sets. An adaptation set represents a set of interchangeable encoded versions of one or more media content components. For example, a period may include one adaptation set for the main video component and a separate adaptation set for the main audio component. In this example, if there is other content available, such as captions or audio descriptions, each of these may have a separate adaptation set.

In various implementations, virtual reality content can be signalled in an adaptation set. For example, an element can be modified or added to the schema for the adaptation set, where the element then signals virtual reality content. In various implementations, attributes can also be modified or added to the adaptation set to provide information about the virtual reality content, such as whether the content is 2-D or 3-D, whether the content is pre-stitched or post-stitched, and/or a mapping for the video frames when the content is post-stitched. In some implementations, a virtual reality indicator in the adaptation set indicates that each of the representations in the adaptation set includes virtual reality content.

An adaptation set can contain multiple alternate representations. A representation describes a deliverable encoded version of one or several media content components. Any single representation within an adaptation set can be used to render the media content components in the period. Different representations in one adaptation sent may be considered perceptually equivalent, meaning that a client device can switch dynamically from one representation to another representation within the adaptation set in order to adapt to network conditions or other factors.

In various implementations, virtual reality content can be signalled in a representation. For example, an element can be modified or added to the schema for the representation, where the element then indicates virtual reality content. In various implementations, attributes can also be modified or added to the representation to provide information about the virtual reality content, such as whether the content is 2-D or 3-D, whether the content is pre-stitched or post-stitched, and/or a mapping for the video frames when the content is post-stitched. In some implementations, a virtual reality indicator in the representation indicates that the content of the representation was formatted for virtual reality.

Another format related to streaming of media content is Session Description Protocol (SDP), which is described in RFC 4566. SDP can be used to describe multimedia communication sessions. Such descriptions can be used, for example, for session announcement, session invitation, and parameter negotiation. SDP is not used to deliver the media itself, but can be used between end points for negotiation of the media type, format, and associated properties. A set of properties and parameters are often referred to as a session profile. SDP was originally a component of the Session Announcement Protocol (SAP), but found other uses in conjunction with Real-time Transfer Protocol (RTP), Real-time Streaming Protocol (RTSP), Session Initiation Protocol (SIP) and as a standalone format for describing multicast sessions.

In various implementations, indication of virtual reality content can be included in a session description and/or in a media description in an SDP message. For example, a field can be added or modified in the session description and/or the media description to indicate the presence of virtual reality content in streaming content. Additionally, in some implementations, parameters relating to the virtual reality content can also be added to an SDP message. Such parameters can include, for example, whether the virtual reality content is 2-D or 3-D, whether the content is pre-stitched or post-stitched, and/or a mapping used to store the data. In this and other examples, SDP can be used in RTP-based streaming, broadcast, and/or telepresence or conference applications to indicate that media content includes virtual reality content.

As another example, Multimedia Broadcast Multicast Services (MBMS) can be used to indicate virtual reality content when the content is transmitted over 3GPP cellular networks. MBMS is a point-to-multipoint interface specification that can provide efficient delivery of broadcast and multicast services, both within a cell and within the core network. Target applications for MBMS include mobile television, live video and audio streamlining, file delivery, and delivery of emergency alerts.

In various implementations, signaling of virtual reality content, as well as parameters related to the content can be accomplished by adding a new feature to the MBMS feature requirement list. In various implementations, signaling of virtual reality content can be accomplished in a similar fashion for other broadcast and multicast applications.

Figure 6:
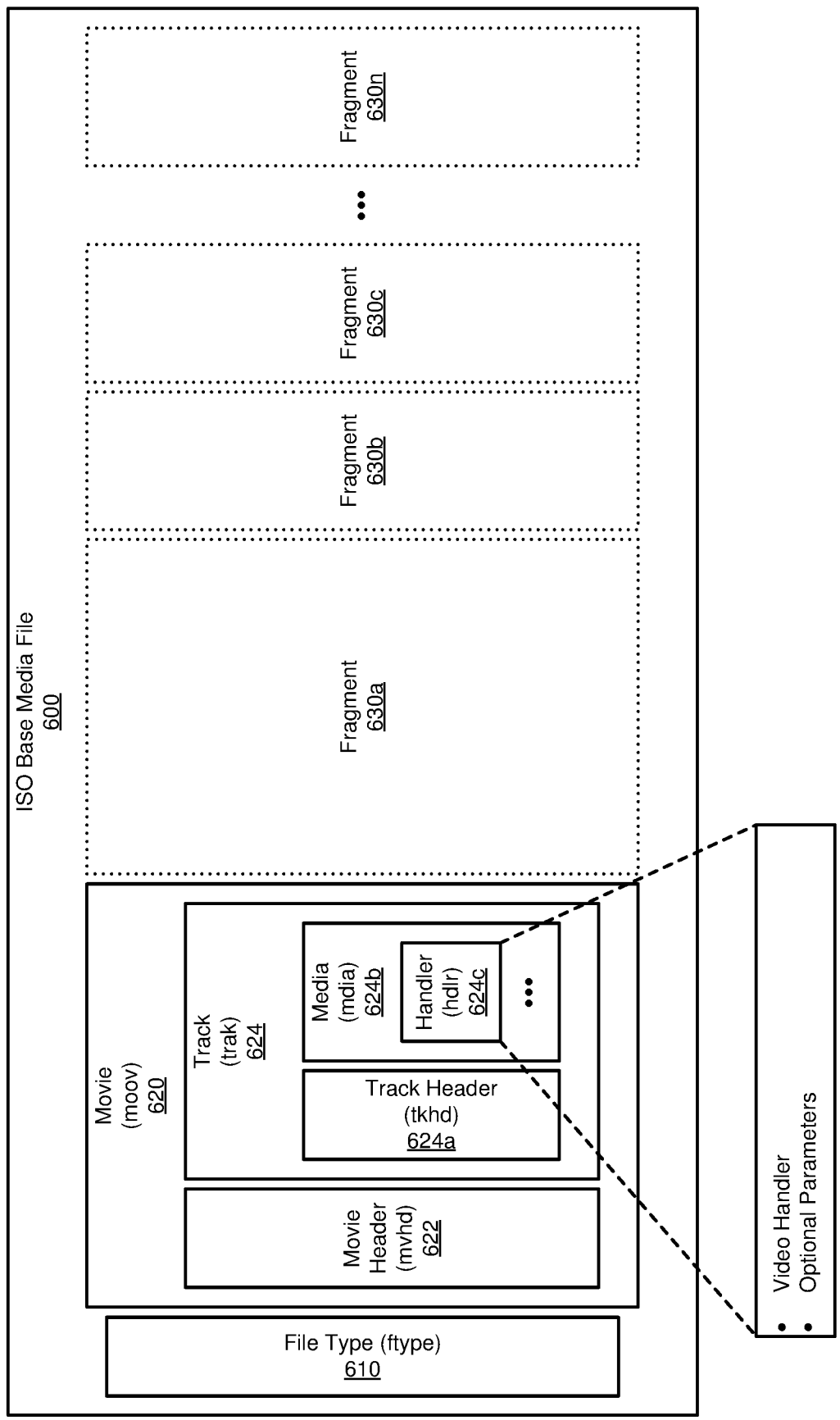
FIG. 6 illustrates one example of an ISO base media file where a handler box is used to signal that the contents of a track include virtual reality video.

In various implementations, when a track in an ISO base media file includes virtual reality content, various additional or alternative approaches can be used to signal the virtual reality content to a player device. FIG. 6 illustrates one example of an ISO base media file 600 where a handler box 624c is used to signal that the contents of a track include virtual reality video. The file 600 can include a file type box 610, which can specify the brand(s) or particular iterations of the ISOBMFF or derivations of the ISOBMFF with which the file 600 is compatible. The file 600 can also include a movie box 620, which can contain the metadata for a presentation. The file 600 can optionally also include one or more fragments 630a, 630b, 630c, 630n, as discussed above.

The movie box 620 can include a movie header box 622 and one or more track boxes 624, as well as other boxes not illustrated here. The movie header box 622 can include information that describes the presentation as a whole. The track box 624 can include the information for a track in the presentation. The track box 624 can include a track header box 624a and zero or more media data boxes 624b.

The media data box 624b can include a handler box 642c, among other boxes. The handler box 642c, which may also be referred to as a handler reference box, can indicate the media type of the track. The media type of the track defines the process by which the media data in the track is presented. Examples of media types include video and audio, among others. The manner in which the media is presented can include a format for the media. For example, a format (e.g., aspect ratio, resolution, frame rate, etc.) that a player device uses to deliver video data in the track can be stored in the video track, and be identified by a video handler version of the handler box 642c. In some cases, the file 600 can include a general handler for metadata streams of any type. In these cases, the specific format of the video content can be identified by a sample entry that describes the content.

In some cases, the media data box 624b can include a handler box 642c. The handler box 642c can be used to indicate that the track described by the track box 624 includes virtual reality data. For example, when the track describes video data, the handler box 642c can specifically be a video handler box, which can be identified by the box type "vide."

In various implementations, the handler box 642c can be used to indicate that the media content referenced by the media data box 624b includes virtual reality content. For example, the handler box 642c can include an optional indicator (e.g., in a reserved bit or new variable) that the video content contained in the track is virtual reality video. Video players that are not configured to read the optional indicator may ignore it.

In some implementations, the video handler box can optionally also include parameters that describe the virtual reality content, such as whether the virtual reality video is 2-D or 3-D, whether the virtual reality video is pre-stitched or post-stitched, and/or a mapping for the virtual reality video. In various implementations, parameters related to the virtual reality content can be indicated in various other boxes that can be found in the track box 524. For example, the parameters can be signalled in the track header box 624a. Alternatively or additionally, the parameters can be signalled in a media header box (identified by box type "mdhd"), and/or in a video media header box (identified by box type "vmhd"), which are not illustrated here. Alternatively or additionally, parameters can be indicated in a sample entry, and/or in a newly defined box that can be placed at the top level of the track box 624.

Figure 7:
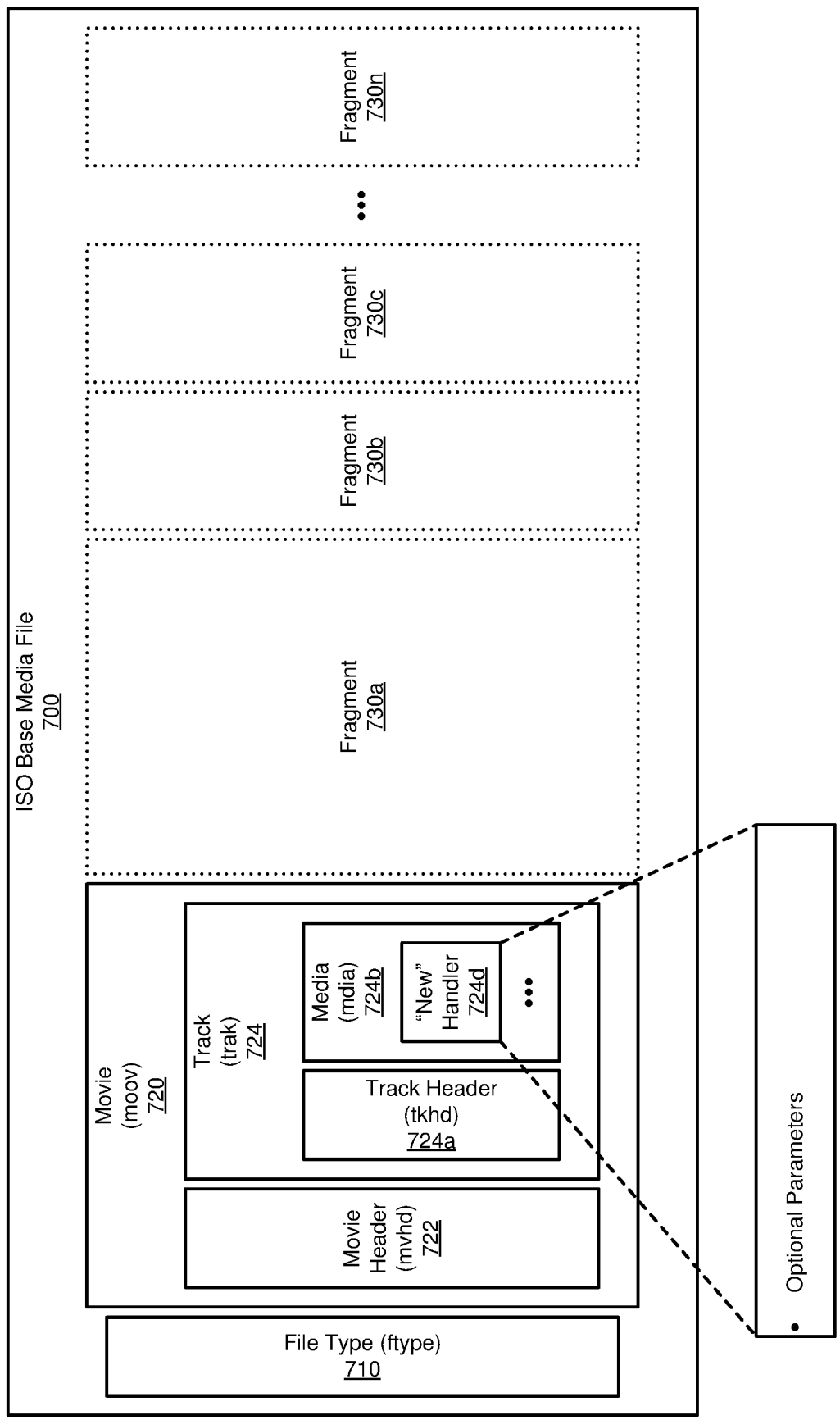
FIG. 7 illustrates an example of an ISO base media file where a new handler box has been defined to indicate that the track includes virtual reality content.

FIG. 7 illustrates an example of an ISO base media file 700 where a new handler box 724d has been defined to indicate that the track includes virtual reality content. The file 700 can include a file type box 710, which can specify the brand(s) or particular iterations of the ISOBMFF or derivations of the ISOBMFF with which the file 700 is compatible. The file 700 can also include a movie box 720, which can contain the metadata for a presentation. The file 700 can optionally also include one or more fragments 730a, 730b, 730c, 730n, as discussed above.

The movie box 720 can include a movie header box 722 and one or more track boxes 724, as well as other boxes not illustrated here. The movie header box 722 can include information that describes the presentation as a whole. The track box 724 can include the information for a track in the presentation. The track box 724 can include a track header box 724a and zero or more media data boxes 724b.

As discussed above, in some cases the media data box 724b can include a handler box 724d, which can describe a format for presenting the media content described by the media data box 724b. In the example of FIG. 7, a new handler box 724d has been defined, which is specific to virtual reality video data. The new handler box 724d can be identified, for example, by the box type "vrvd." In this example, video players that are not compatible with virtual reality content may not be able to identify the new handler box 724d, and thus may ignore the new handler box 724d and skip any content referred to by the track box 724. The virtual reality content will thus not be rendered and displayed by a player that is not configured to display virtual reality video.

In some implementations, the new handler box can optionally also include parameters that describe the virtual reality content, such as whether the virtual reality video is 2-D or 3-D, whether the virtual reality video is pre-stitched or post-stitched, and/or a mapping for the virtual reality video. In various implementations, parameters related to the virtual reality content can be indicated in various other boxes that can be found in the track box 724. For example, the parameters can be signalled in the track header box 724a. Alternatively or additionally, the parameters can be signalled in a media header box (identified by box type "mdhd"), and/or in a video media header box (identified by box type "vmhd"), which are not illustrated here. Alternatively or additionally, parameters can be indicated in a sample entry, and/or in a newly defined box that can be placed at the top level of the track box 724.

Figure 8:
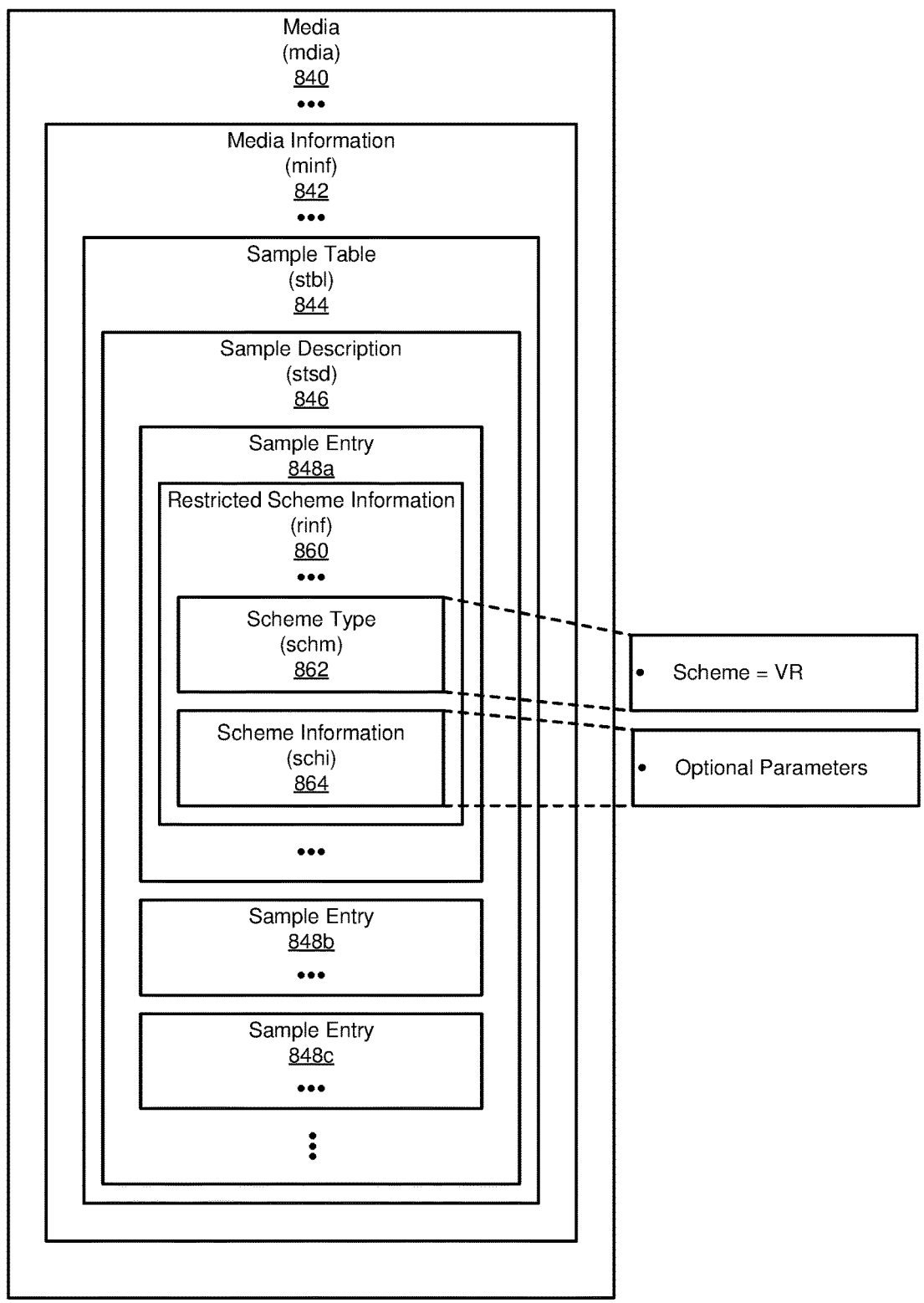
FIG. 8 illustrates an example of a media box that can be included in an ISO base media file.

FIG. 8 illustrates an example of a media box 840 that can be included in an ISO base media file. As discussed above, a media box can be included in a track box, and can contain objects and information that describe media data in the track. In the illustrated example, the media box 840 includes a media information box 842. The media box 840 can also include other boxes, which are not illustrated here.

The media information box 842 can contain objects that describe characteristic information about the media in the track. For example, the media information box 842 can include a data information box, which describes the location of media information in the track. As another example, the media information box 842 can include a video media header, when the track includes video data. The video media header can contain general presentation information that is independent of the coding of the video media. The media information box 842 can also include a sound media header when the track includes audio data.

The media information box 842 can also include a sample table box 844, as provided in the illustrated example. The sample table box 844, identified by the box type "stbl," can provide locations (e.g., locations with a file) for the media samples in the track, as well as time information for the samples. Using the information provided by the sample table box 844, a player device can locate samples in correct time order, determine the type of a sample, and/or determine the size, container, and offset of a sample within a container, among other things.

The sample table box 844 can include a sample description box 846, identified by the box type "stsd." The sample description box 846 can provide detailed information about, for example, the coding type used for a sample, and any initialization information needed for that coding type. The information stored in the sample description box can be specific to a type of the track that includes the samples. For example, one format may be used for the sample description when the track is a video track and a different format may be used when the track is a hint track. As a further example, the format for the sample description may also vary depending on the format of the hint track.

The sample description box 846 can include one or more sample entry boxes 848a, 848b, 848c. The sample entry type is an abstract class, and thus typically the sample description box includes a specific sample entry box, such as a visual sample entry for video data or an audio sample entry for audio samples, among other examples. A sample entry box can store the parameters for a particular sample. For example, for a video sample, the sample entry box can include a width, height, horizontal resolution, vertical resolution, frame count, and/or depth for the video sample, among other things. As another example, for an audio sample, the sample entry can include a channel count, a channel layout, and/or a sampling rate, among other things.

In the illustrated example, the first sample entry 848a includes a restricted scheme information box 860. A restricted scheme information box, identified by the box type "rinf," can contain the information required both to understand a restricted scheme applied to a sample and the parameters of the scheme. In some cases, the author of a file may require certain actions form a player device. In these cases, the file can include a restricted scheme information box, which a player device can locate and use to determine the requirements for rendering the media contents of the file. Players that may not be able to render the content can also use the restricted scheme information box to determine that they cannot render the content, and thus should not attempt to process the content. The restricted scheme information box typically includes an original sample entry type, that is, the type of the sample entry prior to any transformation described by the restricted scheme information box.

In various implementations, a restricted scheme can be defined for virtual reality content. In these implementations, a restricted scheme information box 860 can be added to a sample entry 848a that includes virtual reality data. The type of a restricted scheme can be specified in a scheme type box 862, identified by the box type "schm." For example, an encoding corresponding to "vrvd" can be used to identify a restricted scheme for virtual reality content.

The restricted scheme information box 860 in the illustrated example includes a scheme information box 864, identified by the box type "schi." The scheme information box 864 can store information for a specific scheme. For example, when the restricted scheme is for virtual reality content, the scheme information box 864 can include parameters for the virtual reality content. These parameters can include, for example, whether the virtual reality video is 2-D or 3-D, whether the virtual reality video is pre-stitched or post-stitched, and/or a mapping for the virtual reality video. In various implementations, a scheme information box can be defined for virtual reality content, specifically for containing parameters for the virtual reality content.

Using the technique illustrated in FIG. 8, no new boxes need to be added to the ISOBMFF specification that may not be understood by legacy player devices. Even with new boxes, a legacy player device may attempt to play content that the devices cannot identify, and when this content is virtual reality media, the result can be a distorted presentation. In avoiding adding new boxes, a file can be generated for virtual reality content, where the file likely only includes boxes that a legacy player device can identify. The legacy player device can further determine that the device is unable to implement the restricted scheme described by the restricted scheme information box 864, and thus not attempt to display the virtual reality content.

The technique additionally provides flexibility to both legacy players and players capable of rendering virtual reality content. A legacy player can, for example, determine whether the player understands the virtual reality scheme identified by the restricted scheme information box. When the player device is not able to conform to the restricted scheme, the player device may choose to not render the content in the track at all, or may be able to instead process the original, untransformed samples. The restricted scheme mechanism thus can enable player devices to inspect a file to determine the requirements for rendering a bitstream, and can stop a legacy player device from decoding and rendering files that the device may not be capable of processing.

In various implementations, virtual reality content can alternatively or additionally be included in a supplemental enhancement information (SEI) message in a video bitstream. The SEI message can thus indicate that the bitstream includes virtual reality content. In various implementations, the SEI message can indicate virtual reality content at the level of the file, the movie level, and/or the track level. In various implementations, the SEI message can also include parameters that describe the properties of the virtual reality video (e.g., whether the video is 2-D or 3-D, pre-stitched or post-stitched, etc.).

In various implementations, an extension to the ISOBMFF specification may include a sample entry type "rcvp" for use with a timed metadata track containing recommended viewport timed metadata. The extension may include a box type "rvif" indicating a recommended viewport information box. In some implementations, the recommended viewport may be a most-viewed viewport associated with the virtual reality data as discussed herein. The following text provide the text of Section 7.7.5 of ISO/IEC FDIS 23090-2:201x (E) "Information technology—Coded representation of immersive media (MPEG-I)—Part 2: Omnidirectional media format" dated Feb. 7, 2018.

Recommended Viewport

The recommended viewport timed metadata track indicates the viewport that should be displayed when the user does not have control of the viewing orientation or has released control of the viewing orientation.

> NOTE: The recommended viewport timed metadata track may be used for indicating a recommended viewport based on a director's cut or based on measurements of viewing statistics.

The track sample entry type ' rcvp' shall be used.
The sample entry of this sample entry type is specified as follows:

```
class RcvpSampleEntry( ) extends SphereRegionSampleEntry('rcvp') {
    RcvpInfoBox( ); // mandatory
}
class RcvpInfoBox extends FullBox('rvif', 0, 0) {
    unsigned int(8) viewport_type;
    string viewport_description;
}
``` viewport_type specifies the type of the recommended viewport as listed in Table 0.1.

TABLE 0.1

Recommended viewport type

| Value | Description |
|---|---|
| 0 | A recommended viewport per the director's cut, i.e., a viewport suggested according to the creative intent of the content author or content provider |
| 1 | A recommended viewport selected based on measurements of viewing statistics |
| 2 . . . 239 | Reserved (for use by future extensions of ISO/IEC 23090-2) |

TABLE 0.1-continued

Recommended viewport type

| Value | Description |
|---|---|
| 240 . . . 255 | Unspecified (for use by applications or external specifications) | viewport_description is null-terminated UTF-8 string that provides a textual description of the recommended viewport.
The sample syntax of SphereRegionSample shall be used.
shape_type shall be equal to 0 in the SphereRegionConfigBox of the sample entry.
static_azimuth_range and static_elevation_range, when present, or azimuth_range and elevation_range, when present, indicate the azimuth and elevation ranges, respectively, of the recommended viewport.
centre_azimuth and centre_elevation indicate the centre point of the recommended viewport relative to the global coordinate axes. centre_tilt indicates the tilt angle of the recommended viewport.

Figure 9:
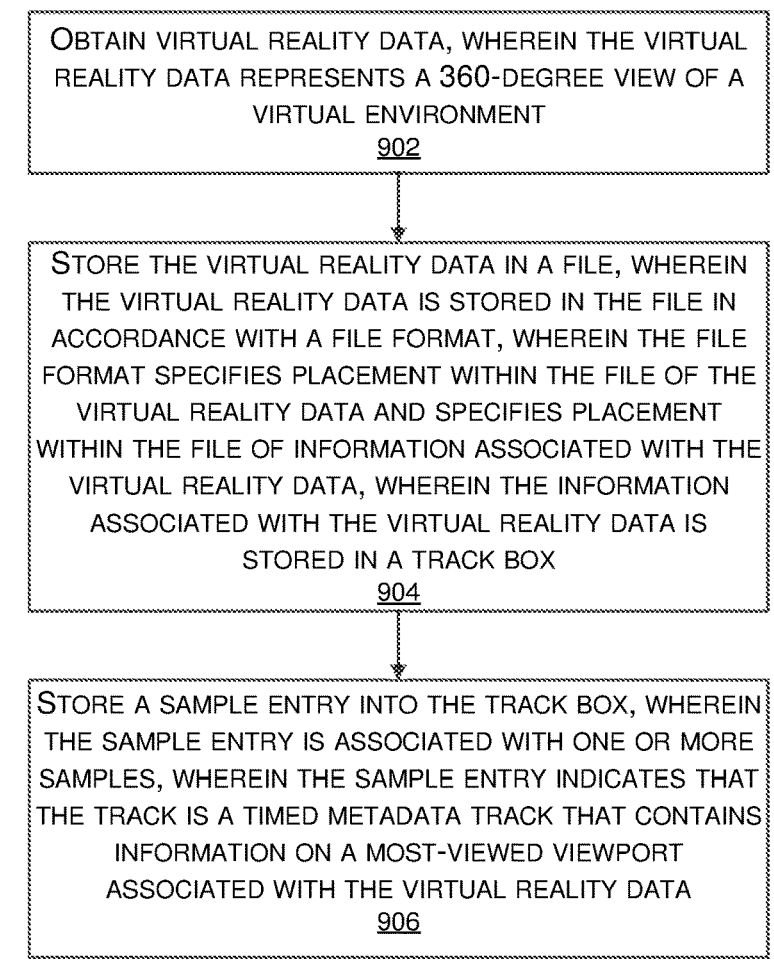
FIG. 9 illustrates an example of a process for generating a file containing virtual reality content.

FIG. 9 illustrates an example of a process 900 for generating a file containing virtual reality content, as described herein. At 902, the process 900 includes obtaining virtual reality data, wherein the virtual reality data represents a 360-degree view of a virtual environment. In some implementations, the virtual reality data includes virtual reality video. In some implementations, the virtual reality video may be pre-stitched. In some implementations, the frames in the virtual reality video may not be assembled, and may require post-stitching. The virtual reality data may be captured and encoded for storage and transmission to a receiving device as discussed herein.

At 904, the process 900 includes storing the virtual reality data to a file, wherein the virtual reality data is stored in accordance with a file format, wherein the file format specifies placement within the file of the virtual reality data and specifies placement within the file of information associated with the virtual reality data, wherein the information associated with the virtual reality data is stored in a track box. In various implementations, the file format is the ISOBMFF or a file format derived from ISOBMFF. In some implementations, information associated with the virtual reality data can include, for example, frame rates, resolutions, the location within the file or within other files of video and/or audio samples, and/or other information. In some implementations, the virtual reality data may be stored in one or more media tracks of the file.

At 906, the process 900 includes storing a sample entry into the track box, wherein the sample entry is associated with one or more samples, wherein the sample entry indicates that the track is a timed metadata track that contains information on a most-viewed viewport associated with the virtual reality data. For example, this may be indicated by the 4CC 'mvvp' as discussed herein.

The most-viewed viewport may be fully covered by a set of signalled most-requested picture regions. Most-requested picture regions may be regions on the spherical surface of the virtual environment content that has been most frequently requested by receiver devices or viewed by prior users at a presentation time during prior playbacks of the virtual reality content. For example, the virtual reality content may include objects that newly appear during playback, and the regions where objects appear may be of interest to the user at the time of appearance. For example, most-requested picture regions may be other regions of interest to the user at specific presentation times during playback.

In some implementations, the process 900 can also include storing parameters related to the virtual reality video (e.g., the optional parameters described herein) to the file. In some implementations, the parameters may be stored in a scheme information box.

Figure 10:
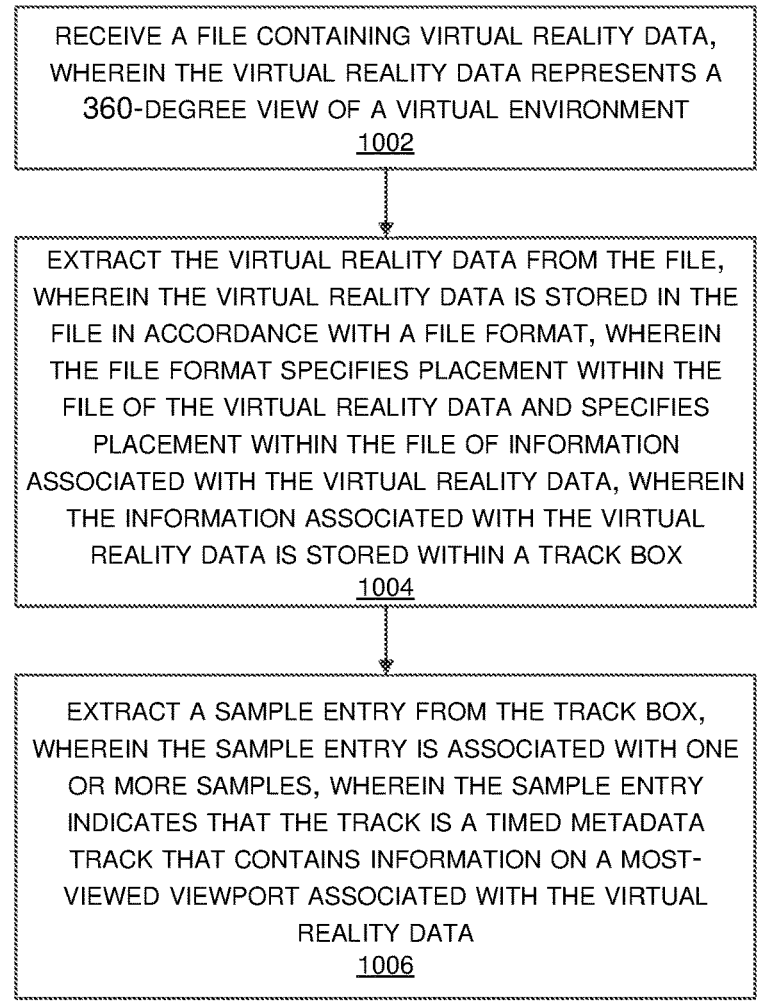
FIG. 10 illustrates an example of a process for extracting virtual reality content from a file.

FIG. 10 illustrates an example of a process 1000 for extracting virtual reality content from a file, as described herein. At 1002, the process includes receiving a file containing virtual reality data, wherein the virtual reality data represents a 360-degree view of a virtual environment, wherein the virtual reality data is stored in the file in accordance with a file format, wherein the file format specifies placement within the file of the virtual reality content and placement within the file of information associated with the virtual reality data, wherein the information associated with the virtual reality data is stored within a track box.

At 1004, the process includes extracting the virtual reality data from the file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box. In various implementations, the file format is based on a ISOBMFF format.

At 1006, the process includes extracting a sample entry from the track box, wherein the sample entry is associated with one or more samples, wherein the sample entry indicates that the track is a timed metadata track that contains information on a most-viewed viewport associated with the virtual reality data. The virtual reality data may then be decoded and rendered on a video display device, as discussed below.

Figure 11:
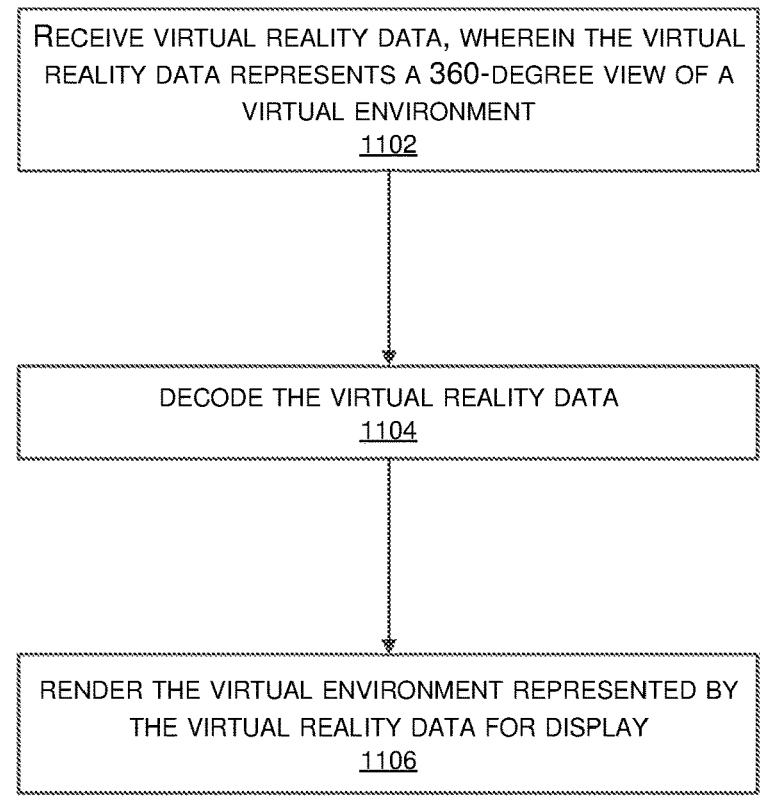
FIG. 11 illustrates an example of a process for decoding and rendering a virtual reality environment.

FIG. 11 illustrates an example of a process 1100 for decoding and rendering a virtual reality environment, as described herein. For example, the process 1100 may execute on a video display device. At 1102, the process 1100 includes receiving virtual reality data, wherein the virtual reality data represents a 360-degree view of a virtual environment. The virtual reality data can include video data and audio data. The virtual reality data may have been generated and extracted by the processes illustrated in FIG. 9 and FIG. 10.

At 1104, the process 1100 includes decoding the virtual reality data. The decoding may proceed as further discussed herein in accordance with the file format. In various implementations, the file format can be based on an ISO base media file format.

At 1106, the process 1100 includes rendering the virtual environment represented by the virtual reality data for display to a user. The rendering may utilize the most-viewed viewport information discussed herein. In some implementations, the most-viewed viewport may be a spherical region viewport specified by four great circles. In other implementations, the most-viewed viewport may be a spherical rectangle viewport specified by two yaw circles and two pitch circles.

In some examples, the processes 900, 1000, and 1100 may be performed by a computing device or an apparatus, such as the system 100. For example, the process 900, 1000, and/or 1100 can be performed by the system 100 and/or the storage 108 or output 110 shown in FIG. 1. In some cases, the computing device or apparatus may include a processor, microprocessor, microcomputer, or other component of a device that is configured to carry out the steps of process 900, 1000, or 1100. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Processes 900, 1000, and 1100 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 900, 1000, and 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
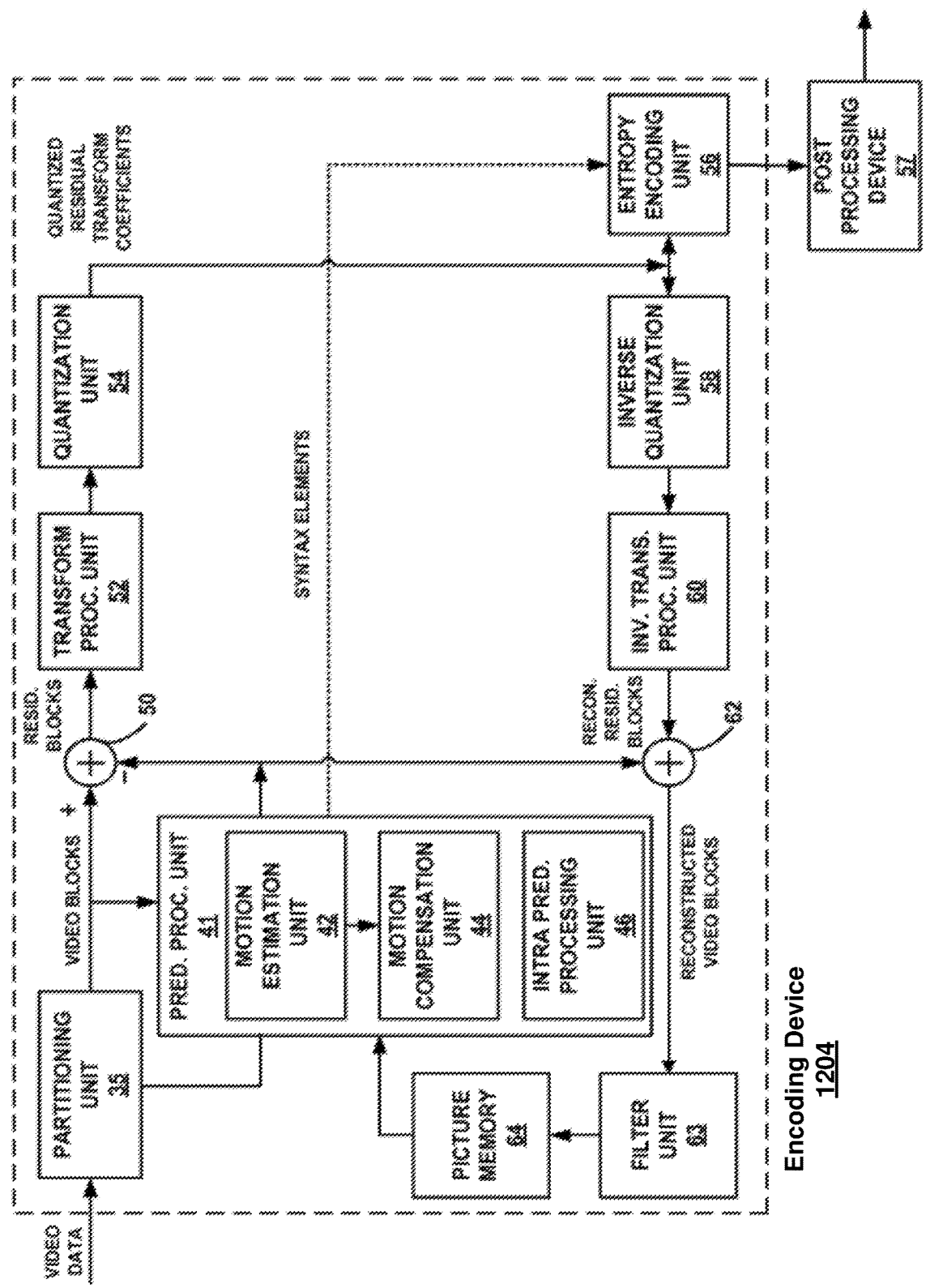
FIG. 12 is a block diagram illustrating an example encoding device that may implement one or more of the techniques described in this disclosure.
Figure 13:
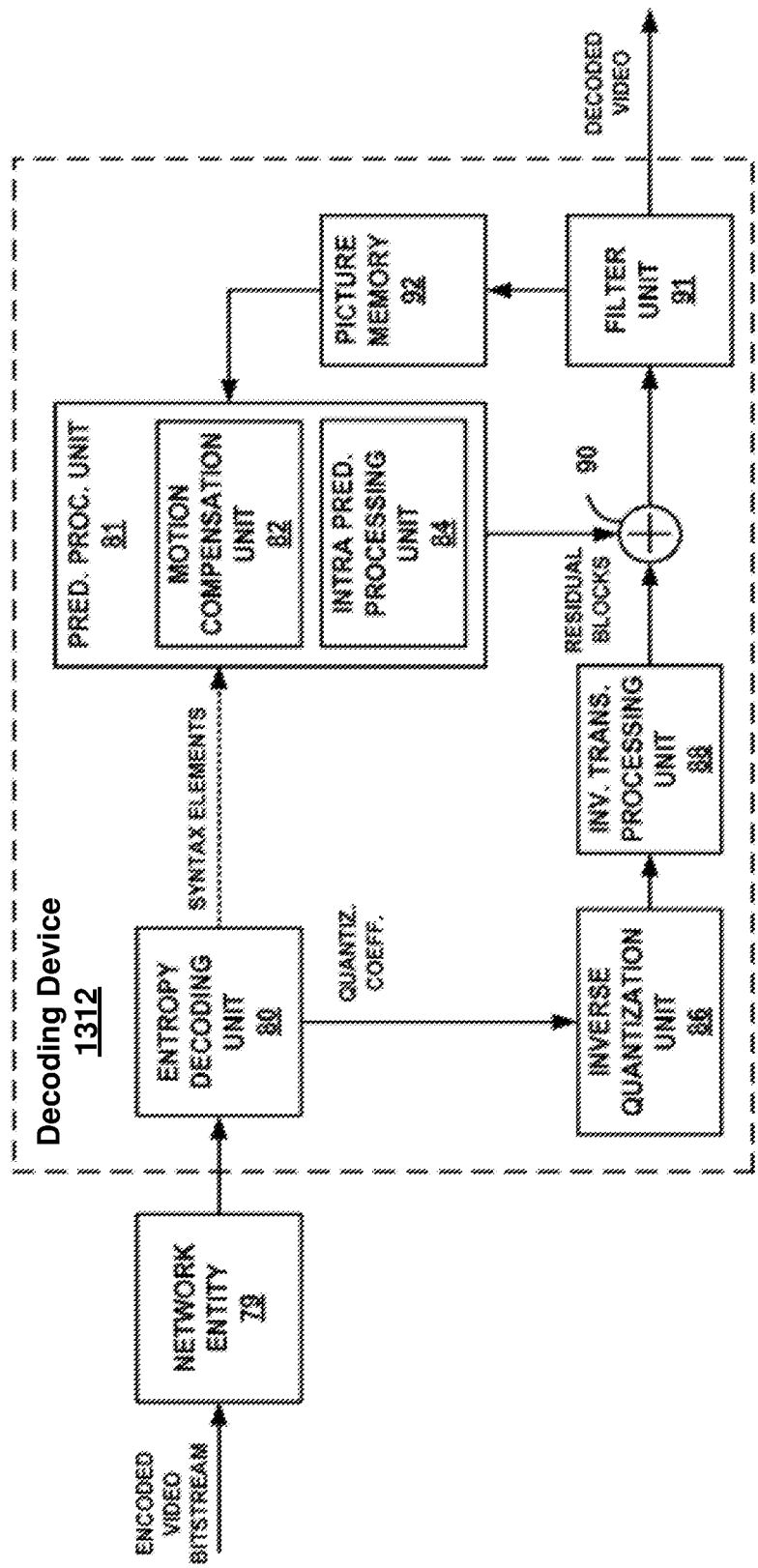
FIG. 13 is a block diagram illustrating an example decoding device.

Specific details of the encoding device 1204 and the decoding device 1312 are shown in FIG. 12 and FIG. 13, respectively. FIG. 12 is a block diagram illustrating an example encoding device 1204 that may implement one or more of the techniques described in this disclosure. Encoding device 1204 may, for example, generate the syntax structures described herein (e.g., the syntax structures of a VPS, SPS, PPS, or other syntax elements). Encoding device 1204 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 1204 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 1204 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by encoding device 1204. The techniques of this disclosure may in some instances be implemented by encoding device 1204. In other instances, however, one or more of the techniques of this disclosure may be implemented by post processing device 57.

As shown in FIG. 12, encoding device 1204 receives video data, and partitioning unit 35 partitions the data into video blocks. The partitioning may also include partitioning into slices, slice segments, tiles, or other larger units, as well as video block partitioning, e.g., according to a quadtree structure of LCUs and CUs. Encoding device 1204 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, encoding device 1204 may calculate values for sub-integer pixel positions of reference pictures stored in picture memory 64. For example, encoding device 1204 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. Encoding device 1204 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by decoding device 1312 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Encoding device 1204 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, encoding device 1204 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to decoding device 1312, or archived for later transmission or retrieval by decoding device 1312. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, encoding device 1204 of FIG. 12 represents an example of a video encoder configured to generate syntax for a encoded video bitstream. Encoding device 1204 may, for example, generate VPS, SPS, and PPS parameter sets as described above. The encoding device 1204 may perform any of the techniques described herein, including the processes described above with respect to FIG. 12 and FIG. 13. The techniques of this disclosure have generally been described with respect to encoding device 1204, but as mentioned above, some of the techniques of this disclosure may also be implemented by post processing device 57.

FIG. 13 is a block diagram illustrating an example decoding device 1312. The decoding device 1312 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. Decoding device 1312 may, in some examples, perform a decoding pass generally reciprocal to the encoding pass described with respect to encoding device 1204 from FIG. 12.

During the decoding process, decoding device 1312 receives an encoded video bitstream that represents video blocks of an encoded video slice and associated syntax elements sent by encoding device 1204. In some embodiments, the decoding device 1312 may receive the encoded video bitstream from the encoding device 1204. In some embodiments, the decoding device 1312 may receive the encoded video bitstream from a network entity 79, such as a server, a media-aware network element (MANE), a video editor/splicer, or other such device configured to implement one or more of the techniques described above. Network entity 79 may or may not include encoding device 1204. Some of the techniques described in this disclosure may be implemented by network entity 79 prior to network entity 79 transmitting the encoded video bitstream to decoding device 1312. In some video decoding systems, network entity 79 and decoding device 1312 may be parts of separate devices, while in other instances, the functionality described with respect to network entity 79 may be performed by the same device that comprises decoding device 1312.

The entropy decoding unit 80 of decoding device 1312 entropy decodes the bitstream to generate quantized coefficients, motion vectors, and other syntax elements. Entropy decoding unit 80 forwards the motion vectors and other syntax elements to prediction processing unit 81. Decoding device 1312 may receive the syntax elements at the video slice level and/or the video block level. Entropy decoding unit 80 may process and parse both fixed-length syntax elements and variable-length syntax elements in one or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signalled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. Decoding device 1312 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by encoding device 1204 during encoding of the video blocks to calculate interpolated values for sub-integer pixels of reference blocks. In this case, motion compensation unit 82 may determine the interpolation filters used by encoding device 1204 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by encoding device 1204 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, decoding device 1312 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 13 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, application specific integrated circuits (ASIC s), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodied in an example video encoding and decoding system. A system includes a source device that provides encoded video data to be decoded at a later time by a destination device. In particular, the source device provides the video data to a destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from a source device to a destination device. In one example, a computer-readable medium may comprise a communication medium to enable a source device to transmit encoded video data directly to a destination device in real-time. The encoded video data may be modulated according to a communication standard, such as a wireless communication protocol, and transmitted to a destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, a system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source devices and destination devices are merely examples of such coding devices in which a source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if a video source is a video camera, a source device and a destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

The invention claimed is:

1. A method of decoding and displaying virtual reality content, comprising:
   receiving a file containing virtual reality data, wherein the virtual reality data represents a 360-degree view of a virtual environment;
   extracting the virtual reality data from the file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box;
   extracting a sample entry from the track box, wherein the sample entry is associated with one or more samples, wherein the sample entry includes a viewport type syntax element, wherein one value of a plurality of possible values of the viewport type syntax element indicates a timed metadata track that contains information on a viewport based on measurements of viewing statistics of the virtual reality data at a presentation time; and
   decoding and rendering the virtual reality data for display to a user.

2. The method of claim 1, wherein the timed metadata track contains data identifying a shape type and data identifying a spherical region viewport specified by four great circles.

3. The method of claim 1, wherein timed metadata track contains data identifying a shape type and data identifying a spherical rectangle viewport specified by two yaw circles and two pitch circles.

4. The method of claim 1, wherein the timed metadata track is further associated with at least one of a group consisting of:
   a director-defined viewport of the virtual reality data,
   a recommended viewport for displaying the virtual reality data,
   a default viewport absent user control over a viewing orientation of the virtual reality data, and
   a producer-defined viewport of the virtual reality data.

5. The method of claim 1, wherein extracting the virtual reality data from the files comprises extracting the virtual reality data from one or more media tracks of the file.

6. The method of claim 1, wherein the virtual reality data is rendered and displayed using the timed metadata track.

7. The method of claim 1, wherein the file format IS based on an International Standards Organization (ISO) base media file format.

8. The method of claim 1, wherein the timed metadata track is further associated with a recommended viewport defined by an external application, and wherein the set of most-requested picture regions fully covering the viewport is a minimum set.

9. An apparatus for decoding and displaying virtual reality content, comprising:
a receiver implemented in circuitry configured to receive a file containing virtual reality data, wherein the virtual reality data represents a 360-degree view of a virtual environment; and
a processor implemented in circuitry configured to,
extract the virtual reality data from the file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box,
extract a sample entry from the track box, wherein the sample entry is associated with one or more samples, wherein the sample entry includes a viewport type syntax element, wherein one value of a plurality of possible values of the viewport type syntax element indicates a timed metadata track idea that contains information on a viewport based on measurements of viewing statistics of the virtual reality data at a presentation time, and
decode and render the virtual reality data for display to a user.

10. The apparatus of claim 9, wherein the timed metadata track contains data identifying a shape type and data identifying a spherical region viewport specified by four great circles.

11. The apparatus of claim 9, wherein the timed metadata track contains data identifying a shape type and data identifying a spherical rectangle viewport specified by two yaw circles and two pitch circles.

12. The apparatus of claim 9, wherein the timed metadata track is further associated with at least one of a group consisting of:
a director-defined viewport of the virtual reality data,
a recommended viewport for displaying the virtual reality data,
a default viewport absent user control over a viewing orientation of the virtual reality data, and
a producer-defined viewport of the virtual reality data.

13. The apparatus of claim 9, wherein extracting the virtual reality data from the files comprises extracting the virtual reality data from one or more media tracks of the file.

14. The apparatus of claim 9, wherein the virtual reality data is rendered and displayed using the timed metadata track.

15. The apparatus of claim 9, wherein the file format IS based on an International Standards Organization (ISO) base media file format.

16. A method of storing virtual reality content, comprising:
obtaining virtual reality data, wherein the virtual reality data represents a 360-degree view of a virtual environment;
storing the virtual reality data into a file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box; and
storing a sample entry from the track box, wherein the sample entry is associated with one or more samples, wherein the sample entry includes a viewport type syntax element, wherein one value of a plurality of possible values of the viewport type syntax element indicates a timed metadata track that contains information on a viewport based on measurements of viewing statistics of the virtual reality data at a presentation time.

17. The method of claim 16, wherein the information on the timed metadata track contains data identifying a shape type and data identifying a spherical region viewport specified by four great circles.

18. The method of claim 16, wherein the information on the timed metadata track contains data identifying a shape type and data identifying a spherical rectangle viewport specified by two yaw circles and two pitch circles.

19. The method of claim 16, wherein the timed metadata track is further associated with at least one of a group consisting of:
a director-defined viewport of the virtual reality data,
a recommended viewport for displaying the virtual reality data,
a default viewport absent user control over a viewing orientation of the virtual reality data, and
a producer-defined viewport of the virtual reality data.

20. The method of claim 16, wherein extracting the virtual reality data from the files comprises extracting the virtual reality data from one or more media tracks of the file.

21. The method of claim 16, wherein the file format is based on an International Standards Organization (ISO) base media file format.

22. An apparatus for storing virtual reality content, comprising:
a receiver implemented in circuitry configured to obtain virtual reality data, wherein the virtual reality data represents a 360-degree view of a virtual environment; and
a processor implemented in circuitry configured to,
store the virtual reality data into a file, wherein the virtual reality data is stored in the file in accordance with a file format, wherein the file format specifies placement within the file of the virtual reality data and specifies placement within the file of information associated with the virtual reality data, wherein the information associated with the virtual reality data is stored within a track box; and
store a sample entry from the track box, wherein the sample entry is associated with one or more samples, wherein the sample entry includes a viewport type syntax element, wherein one value of a plurality of possible values of the viewport type syntax element indicates a timed metadata track that contains information on a viewport based on measurements of viewing statistics of the virtual reality data at a presentation time.

23. The apparatus of claim 22, wherein the information on the timed metadata track contains data identifying a shape type and data identifying a spherical region viewport specified by four great circles.

24. The apparatus of claim 22, wherein the information on the timed metadata track contains data identifying a shape type and data identifying a spherical rectangle viewport specified by two yaw circles and two pitch circles.

25. The apparatus of claim 22, wherein the timed metadata track is further associated with at least one of a group consisting of:
- a director-defined viewport of the virtual reality data,
- a recommended viewport for displaying the virtual reality data,
- a default viewport absent user control over a viewing orientation of the virtual reality data, and
- a producer-defined viewport of the virtual reality data.

26. The apparatus of claim 22, wherein extracting the virtual reality data from the files comprises extracting the virtual reality data from one or more media tracks of the file.

27. The apparatus of claim 22, wherein the file format is based on an International Standards Organization (ISO) base media file format.

\* \* \* \* \*